United States Patent
Wang et al.

(10) Patent No.: US 12,422,849 B2
(45) Date of Patent: Sep. 23, 2025

(54) METHOD FOR BUILDING CONTROLLER FOR ROBOT, METHOD, DEVICE FOR CONTROLLING MOTION OF ROBOT, AND ROBOT

(71) Applicant: Tencent Technology (Shenzhen) Company Limited, Guangdong (CN)

(72) Inventors: Shuai Wang, Shenzhen (CN); Jingfan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 292 days.

(21) Appl. No.: 18/203,910

(22) Filed: May 31, 2023

(65) Prior Publication Data
US 2023/0305563 A1    Sep. 28, 2023

Related U.S. Application Data

(63) Continuation of application No. PCT/CN2022/134041, filed on Nov. 24, 2022.

(30) Foreign Application Priority Data

Mar. 1, 2022  (CN) ......................... 202210194306.X

(51) Int. Cl.
*G05D 1/00*   (2024.01)

(52) U.S. Cl.
CPC ................... *G05D 1/0212* (2013.01)

(58) Field of Classification Search
CPC .................................................. G05D 1/0212
See application file for complete search history.

(56) References Cited

U.S. PATENT DOCUMENTS

2023/0087057 A1    3/2023   Wang et al.

FOREIGN PATENT DOCUMENTS

CN           113753150 A       12/2021

OTHER PUBLICATIONS

Ding, Lijia, D., "Research on Balance Control and Gait Planning of Biped Robot" University of Electronic Science and Technology of China, Feb. 15, 2018. (English Abstract Submitted).
International Search Report and Written Opinion received for PCT Patent Application No. PCT/CN2022/134041, mailed on Feb. 13, 2023, 12 pages (3 pages of English Translation and 9 pages of Original Document).

*Primary Examiner* — Vivek D Koppikar
*Assistant Examiner* — Paul W Arellano
(74) *Attorney, Agent, or Firm* — ArentFox Schiff LLP

(57) ABSTRACT

In a method for controlling a robot, movement of the robot is controlled according to a first controller. Motion state data and control data of the robot are obtained while the movement of the robot is controlled according to the first controller. A linear equilibrium parameter matrix of the first controller is updated according to a policy iteration algorithm that uses the obtained motion state data and the control data. A second controller of the robot is built based on the updated linear equilibrium parameter matrix.

16 Claims, 12 Drawing Sheets

Robot losing equilibrium due to low-speed motion

Robot losing equilibrium due to high-speed motion

Robot maintaining an equilibrium/equilibrium-like state for a period of time

State A  State B  State C  State D

METHOD FOR BUILDING CONTROLLER FOR ROBOT, METHOD, DEVICE FOR CONTROLLING MOTION OF ROBOT, AND ROBOT

CROSS-REFERENCE TO RELATED APPLICATIONS

The present application is a continuation of International Application No. PCT/CN2022/134041, filed on Nov. 24, 2022, which claims priority to Chinese Patent Application No. 202210194306.X, entitled "METHOD FOR BUILDING CONTROLLER FOR ROBOT, AND ROBOT" and filed on Mar. 1, 2022. The entire disclosures of the prior applications are hereby incorporated by reference.

FIELD OF THE TECHNOLOGY

The present disclosure relates to the field of artificial intelligence and robots, including to a method for building a controller for a robot, a method, device for controlling motion of a robot, a robot, a computer readable storage medium, and a computer program product.

BACKGROUND OF THE DISCLOSURE

With wide application of artificial intelligence and robot technologies in civil and commercial fields, robots based on artificial intelligence and robot technologies play an increasingly important role in intelligent transportation, smart home and other fields, and also face higher requirements.

At present, when controlling motion of a robot, especially an underactuated robot, it is usually necessary to design a dynamic model accurately corresponding to the mechanical structure of the robot, and then the control force at each joint of the robot is determined based on the change of the dynamic model during the motion process, to ensure equilibrium of the robot during the motion process. However, due to complexity of the mechanical structure of a robot, especially for some wheel-legged robots, it may be difficult to obtain an accurate dynamic model even if the mechanical structure of the robot is known. Furthermore, even if the dynamic model is known, it may be difficult to accurately perform parameter identification in the dynamic model in some cases. If the parameters of the dynamic model are known but not accurate, the controller effects of the robot are thus not ideal. Therefore, it is necessary to propose a scheme for flexibly controlling the robot.

SUMMARY

The present disclosure provides a method for building a controller for a robot, a method, device for controlling motion of a robot, a robot, a non-transitory computer-readable storage medium and a computer program product.

In an aspect, the present disclosure provides a method for controlling a robot. In the method for controlling the robot, movement of the robot is controlled according to a first controller. Motion state data and control data of the robot are obtained while the movement of the robot is controlled according to the first controller. A linear equilibrium parameter matrix of the first controller is updated according to a policy iteration algorithm that uses the obtained motion state data and the control data. A second controller of the robot is built based on the updated linear equilibrium parameter matrix.

In another aspect, the present disclosure provides a method for controlling a robot. In the method, for controlling the robot, motion trajectory information that indicates a motion trajectory of the robot is received. A driving force, which is applied to driving wheels of the robot by a first controller based on the motion trajectory information, is controlled to move the robot according to the motion trajectory. Motion state data and control data of the robot are obtained during the movement according to the motion trajectory. A second controller of the robot is built according to a policy iteration algorithm that uses the motion state data and the control data. The driving force applied to the driving wheels is controlled according to the second controller.

In still another aspect, the present disclosure provides a robot control apparatus including processing circuitry. The processing circuitry is configured to control movement of a robot according to a first controller. The processing circuitry is configured to obtain motion state data and control data of the robot while the movement of the robot is controlled according to the first controller. The processing circuitry is configured to update a linear equilibrium parameter matrix of the first controller according to a policy iteration algorithm that uses the obtained motion state data and the control data. Further, the processing circuitry is configured to build a second controller of the robot based on the updated linear equilibrium parameter matrix.

In still another aspect, the present disclosure provides a robot that includes the robot control apparatus, wheel legs, and a driving motor. The driving motor is configured to drive driving wheels of the wheel legs to move the robot according to the first controller or the second controller.

In still another aspect, the present disclosure provides a device for building a controller for a robot, the device including a motion control module, a policy iteration module, and a second controller building module. The motion control module is configured to control motion of the robot using a first controller, and obtain motion state data and control data of the robot during the motion process. The policy iteration module is configured to update a linear equilibrium parameter matrix of the first controller using a policy iteration manner according to the motion state data and the control data. The second controller building module is configured to build a second controller corresponding to dynamic characteristics of the robot based on the updated linear equilibrium parameter matrix.

In still another aspect, the present disclosure provides a device for controlling motion of a robot, the robot moving by driving wheels, the device including an instruction receiving module, an instruction execution module, a data obtaining module, a policy iteration module, and a driving force control module. The instruction receiving module is configured to receive a motion instruction indicating a motion trajectory of the robot. The instruction execution module is configured to control a driving force applied to the driving wheels by the first controller according to the motion instruction, to cause the robot to move according to the motion trajectory. The data obtaining module is configured to obtain motion state data and control data of the robot during the motion process. The policy iteration module is configured to build a second controller corresponding to dynamic characteristics of the robot using a policy iteration manner based on the motion state data and the control data. The driving force control module is configured to control a driving force applied to the driving wheels using the second controller to cause smooth motion of the robot.

In still another aspect, the present disclosure provides a non-transitory computer readable storage medium, storing instructions which when executed by one or more processors cause the one or more processors to perform any of the above methods.

In still another aspect, the present disclosure provides a computer program product comprising computer-readable instructions, the computer-readable instructions, when executed by one or more processors, performing any of the above methods.

BRIEF DESCRIPTION OF THE DRAWINGS

To describe the technical solutions in the embodiments of the present disclosure more clearly, the following briefly describes the drawings. The drawings in the following description show merely some embodiments of the present disclosure. The following drawings are not intended to be drawn to scale proportionally to actual sizes, emphasis instead being placed upon illustrating the subject matter of the present disclosure.

DESCRIPTION OF EMBODIMENTS

Figure 1:
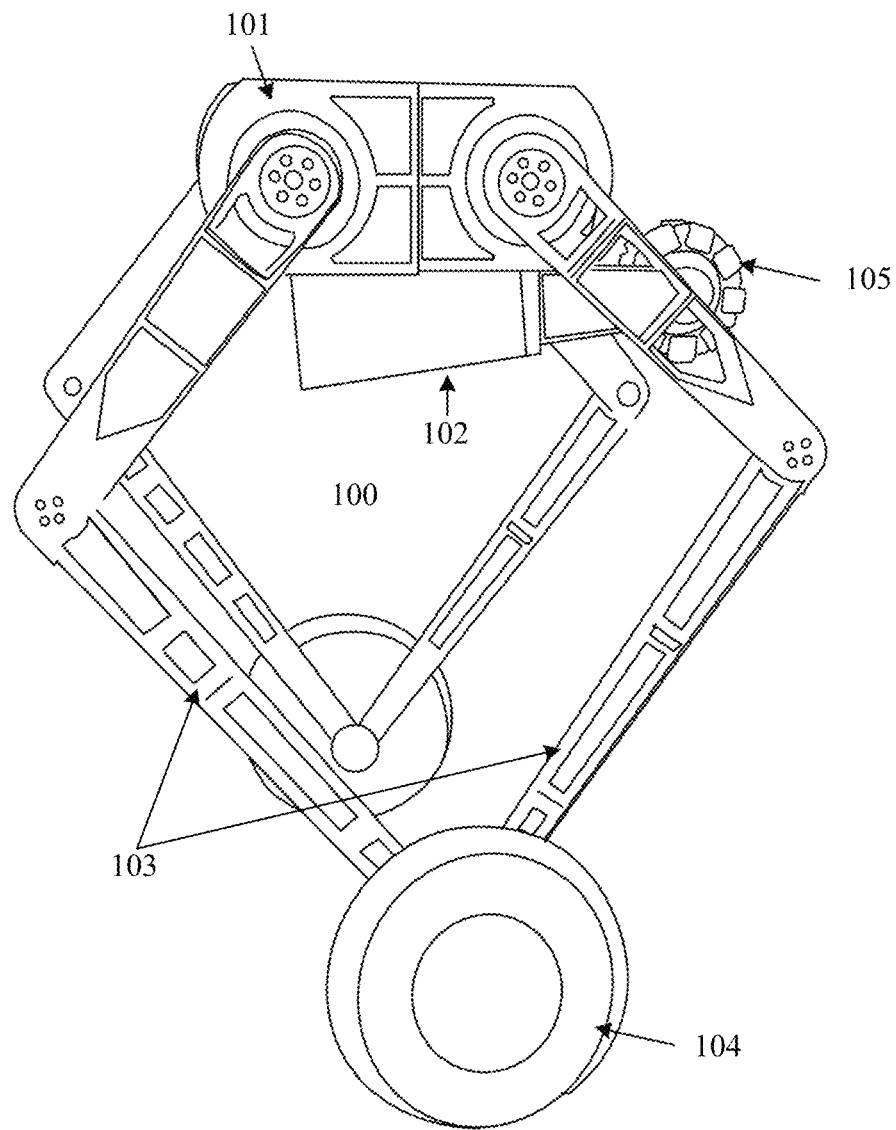
FIG. 1 illustrates a schematic structural diagram of a robot with left and right wheel legs in a single wheel-legged configuration according to an embodiment of the present disclosure.

The following describes technical solutions in embodiments of the present disclosure with reference to the drawings. The described embodiments are merely exemplary embodiments of the present disclosure. Other embodiments are within the scope of the present disclosure.

As illustrated in the present disclosure and claims, words such as "a/an," "one," "one kind," and/or "the" do not refer specifically to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

Although the present disclosure makes various references to some modules in the system according to the embodiments of the present disclosure, any quantity of different modules may be used and run on a user terminal and/or a server. The modules are merely illustrative, and different aspects of the system and method may use different modules.

Flowcharts are used in the present disclosure for illustrating operations performed by systems according to embodiments of the present disclosure. It is to be understood that, the foregoing or following operations are not necessarily strictly performed according to an order. On the contrary, various steps may be performed in a reverse order or simultaneously according to needs. Meanwhile, other operations may be added to the processes, or one or more operations may be deleted from the processes.

The present disclosure includes technical solutions relating to robot technologies in artificial intelligence and intelligent control of robots. A robot may include a kind of mechanical and electronic equipment which combines mechanical transmission and modern microelectronics technologies to imitate certain human skills, and is developed on the basis of electronics, machinery and information technologies. A robot does not have to look like a human. For example, as long as it can complete tasks and instructions given by humans, the robot may be considered a member of the robot family. A robot may include an automated machine that possesses some intelligent capabilities similar to those of a human or a living being, such as perception, planning, movement and collaboration, and possesses a high degree of flexibility. With development of the computer technology and the artificial intelligence technology, a robot is greatly improved in functional and technical levels, and technologies such as mobile robots and robot vision and tactile are typical representatives.

The present disclosure relates to an application of artificial intelligence to robot control, for example, the present disclosure provides a method for building a controller for a robot based on artificial intelligence. The solution adds use of an arbitrary controller to be optimized to build a controller corresponding to dynamic characteristics of the robot. The robot under control of the controller corresponding to dynamic characteristics of the robot has a motion state closer to an equilibrium point relative to the robot under control of the arbitrary controller to be optimized.

The robot to which the present disclosure relates may be an underactuated robot. Underactuation is, for example, a kind of nonlinear control object with the number of independent control variables less than the number of degrees of freedom. For example, the underactuated robot may be a wheel-legged robot as illustrated in FIG. 1. FIG. 1 illustrates a schematic structural diagram of a robot with left and right wheel legs in a single wheel-legged configuration according to an embodiment of the present disclosure.

FIG. 1 illustrates a schematic structural diagram of a robot 100 in an embodiment. The wheel-legged robot 100 may include: wheel legs 103; the wheel legs 103 include driving wheels 104 which may also be referred to as feet. The wheel-legged robot 100 may further include a base portion 101, the base portion 101 may refer to a main body part of the robot and may be, for example, a trunk portion of the robot, and the base portion may be, for example, a planar plate-like member or a rectangular parallelepiped-shaped member that is connected to the wheel legs of the robot. As an example, one end of the wheel legs 103 is connected to the base portion 101, and the other end is connected to the driving wheels 104. The base portion 101 is equipped with a power output device (for example, a motor), which can be used for providing power to the driving wheels for driving the wheel legs 103. It is to be understood that the robot may further include a base portion connected to the wheel legs or an additional member arranged on the base portion according to actual needs. It is to be understood that merely one structure example of the robot is given above, and embodiments of the present disclosure are not limited by the specific members of the robot and connection manners thereof.

The driving wheels 104 connected to the wheel legs 103 may enable the wheel-legged robot 100 to perform both walking and wheel motion. The wheel-legged robot 100 may further include a controllable additional member 102 (for example, a tail) and the tail may be used to equilibrate the wheel-legged robot and may also assist in motion of the wheel-legged robot. For example, the tail may assist the wheel-legged robot in maintaining equilibrium during motion. The wheel-legged robot may further include a controllable robotic arm and the robotic arm may be used to perform operation tasks such as handling, picking, and the like. The wheel-legged robot may further include a multi-foot wheel-legged robot, such as a two-foot wheel-legged robot and a four-foot wheel-legged robot.

For example, the wheel legs 103 are parallel legs (the position of the equilibrium point is between two legs of the two-foot wheel-legged robot 100). Referring to FIG. 1, the wheel legs 103 of the robot 100 include a left wheel leg and a right wheel leg, and each of the left wheel leg and the right wheel leg includes a driving wheel and two parallel legs connected to a central axis of the driving wheel and for realizing motion control of the driving wheel. For example, the left wheel leg includes a left driving wheel, a first left wheel leg and a second left wheel leg and the first left wheel leg and the second left wheel leg are connected in parallel; the right wheel leg 112 includes, for example, a right driving wheel, a first right wheel leg and a second right wheel leg, and the first right wheel leg and the second right wheel leg are connected in parallel. As illustrated in FIG. 1, the left wheel leg and the right wheel leg are in mirror symmetry.

For example, the number of driving wheels may be one, two, four, or other, and the motion of each driving wheel may be controlled by two legs in parallel or multiple legs in series. It is to be understood that embodiments of the present disclosure are not limited by the specific composition types of the left wheel leg and the right wheel leg and the number of driving wheels thereof. In some embodiments, both the left wheel leg and the right wheel leg are of a single wheel leg configuration. A single wheel leg configuration means that the wheel leg comprises merely a single driving wheel.

For example, the left wheel leg and the right wheel leg may comprise the same number of joints and have the same joint configuration, or the left wheel leg and the right wheel leg may, for example, have a different number of joints or a different joint configuration, or both, depending on actual needs. Embodiments of the present disclosure are not limited by the specific number of joints and the joint configuration of the left wheel leg and the right wheel leg. Taking the example illustrated in FIG. 1 as an example, each of the left wheel leg and right wheel leg includes five joints and has a total of two rotational degrees of freedom, and the change in the height of the center of mass of the wheel legs/base portion and the tilt angle of the base portion can be adjusted by adjusting each joint of the wheel legs 103.

The legs of the robot can be either serial legs or parallel legs. Compared to the serial legs, the parallel legs have stronger stiffness and can withstand the impact that may be induced in complex motion. The driving wheels 104 may provide motion capability for the wheel-legged robot 100 to glide while in contact with the ground. the two-foot wheel-legged robot 100 may further include an additional member 102 connected to the base portion 101. The additional member 102 may be equipped with a driven wheel 105. The additional member 102 may include one rotational degree of freedom. Motion of the additional member 102 also affects changes of the base portion 101 and the wheel legs 103, for example, the position change of the additional member may drive the base portion to enable the base portion to have a certain rotation velocity. Thus, equilibrium and posture of the robot 100 can be adjusted by adjusting the position of the additional member 102.

The wheel-legged robot 100 has both the flexibility of a wheeled robot and the flexibility of a legged robot, so it can move quickly on a flat ground and cross a bumpy road. However, for some wheel-legged robots (similar to the wheel-legged robot 100 illustrated in FIG. 1), merely two contact points exist between the robot and the ground. The wheel-legged robot 100 is a non-minimum phase system, it may still be difficult to control the equilibrium of the wheel-legged robot 100 in practical applications. Furthermore, it may be difficult to determine dynamic characteristics of the (wheel-legged) robot due to its complex mechanical structure. Because the traditional equilibrium control method needs to know the dynamic characteristics of the robot, it may be difficult for the traditional equilibrium control method to control the equilibrium of such a robot without knowing the dynamic characteristics.

A method for building a controller of a robot provided by an embodiment of the present disclosure relates to designing a controller that enables the robot to maintain equilibrium during motion by using an adaptive dynamic programming (ADP) method and/or a whole body dynamic method under the condition that the dynamic characteristics of the robot are unknown. The ADP essentially addresses the infinite time domain LQR problem, but the parameters of the system model are partially or completely unknown. Therefore, the algebraic Riccati equation may not be solved analytically. According to the embodiment of the present disclosure, the solution to the LQR problem can still be obtained through an artificial intelligence scheme under the condition that the LQR problem may not be solved based on a system model.

In an example, the adaptive dynamic programming method may be based on a data-driven policy iteration (PI) scheme (or algorithm).

For example, an embodiment of the present disclosure proposes a policy iteration method based on adaptive dynamic programming, and in some embodiments in combination with an optimal control technology. The policy iteration method based on adaptive dynamic programming can dynamically iterate a controller under the condition that the dynamic parameters of the robot are changed or the dynamic characteristics are unknown, so as to obtain a controller corresponding to the dynamic characteristics of the robot after the parameters are changed. The controller enables the robot to move along the target trajectory with the optimal control effect in the equilibrium state even if the dynamic parameters of the robot are changed.

As an example, a value iteration method based on adaptive dynamic programming may not require any initial controller, but the amount of data required is relatively large, and it is more suitable for an off-line iteration controller. Although the policy iteration method based on adaptive dynamic programming requires an initial controller, the amount of data required is less than that of the value iteration method based on adaptive dynamic programming.

An embodiment of the present disclosure addresses an optimal equilibrium control problem for a robot controller without knowledge of dynamic characteristics of the robot based on artificial intelligence, such as reinforcement learning and ADP technologies, using policy iteration, value iteration, or whole body dynamic control technologies. The process of building the controller of the embodiment of the present disclosure merely requires that the wheel-legged robot travels for a period of time or a section of trajectory under the control of a non-optimal controller or an arbitrary controller, and collects motion state data and control data corresponding to the period of time or the section of trajectory as training data. Thus, the amount of training data of the embodiment of the present disclosure is can be smaller than the amount of data required by a related reinforcement learning algorithm.

Further, according to the embodiment of the present disclosure, the trained controller gradually converges to a controller corresponding to the optimal solution to the linear quadratic regulation problem as the learning step increases, so that stability of a close-loop system can be ensured, the training process is greatly simplified, and additional limitations on training data are not required, to simplify the design process of a controller for a wheel-legged robot. Further, in the embodiments of the present disclosure, the data is collected from real robots, and the control policy obtained based on the data of the real robots is directly applied to the robot, so that the application effect of the controller on the real robots is improved without considering the difference between the simulated control and the real control.

To facilitate further description of the present disclosure, exemplary meanings of various operators and sets that may be used hereinafter are briefly explained herein.

In the present disclosure, $\mathbb{R}$ represents the set of real numbers. $|\cdot|$ represents the Euclidean norm of a vector. $\otimes$ represents Kronecker product. Bold letters represent vectors or matrices. Italic letters represent scalars.

For any matrix $A=[a_1, \ldots, a_n]$, $\text{vec}(A)=[a_1^T, \ldots, a_n^T]^T$. For any symmetric matrix $S=[s_{i,j}]$, $\text{vecs}(S)=[s_{1,1}, 2s_{1,2}, \ldots, 2s_{1,n}, s_{2,2}, 2s_{2,3}, \ldots, 2s_{n-1,n}, s_{n,n}]^T$. For any vector $x \in \mathbb{R}^n$, $\text{vecv}(X)=[x_1^2, x_1 x_2, \ldots, x_1 x_n, x_2^2, \ldots, x_n^2]^T$.

Figure 2:
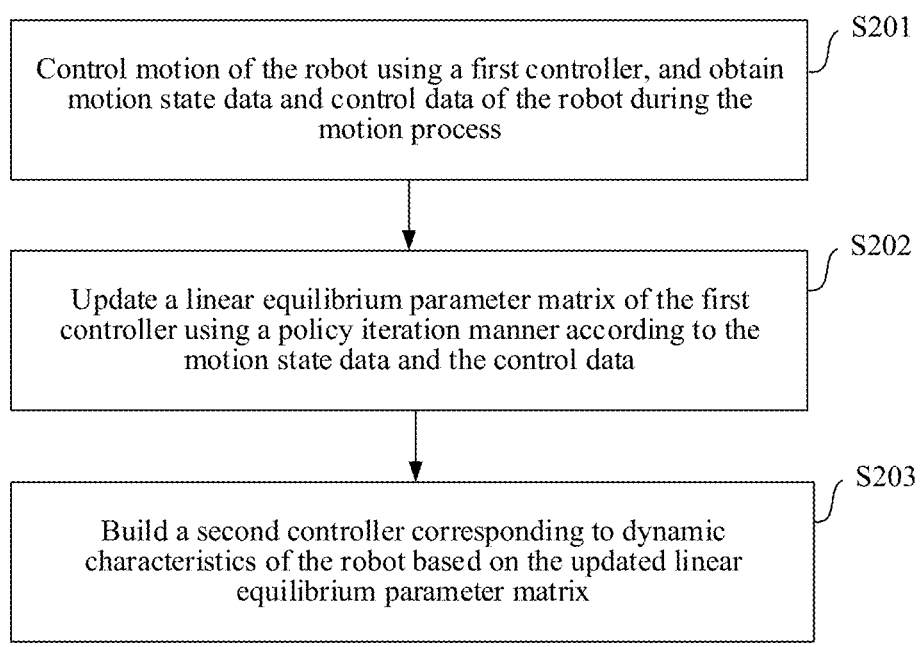
FIG. 2 illustrates an exemplary flowchart of a method for building a controller for a robot according to an embodiment of the present disclosure.

FIG. 2 illustrates an exemplary flowchart of a method for building a controller for a robot according to an embodiment of the present disclosure.

As illustrated in FIG. 2, the method for building a controller for a robot according to at least one embodiment of the present disclosure may include steps S201 to S203. Steps S201 to S203 may be performed online or offline, and the present disclosure is not limited thereto.

As described above, the method for building a controller for a robot may be applied to any robot that includes wheel legs, and the wheel legs include driving wheels. For convenience of description, the method for building a controller for a robot is further described next by taking the robot 100 shown in FIG. 1 as an example. The robot 100 of FIG. 1 is further labeled with reference to FIG. 3 in order to describe various characteristic quantities involved in the method for building a controller for a robot.

Figure 3:
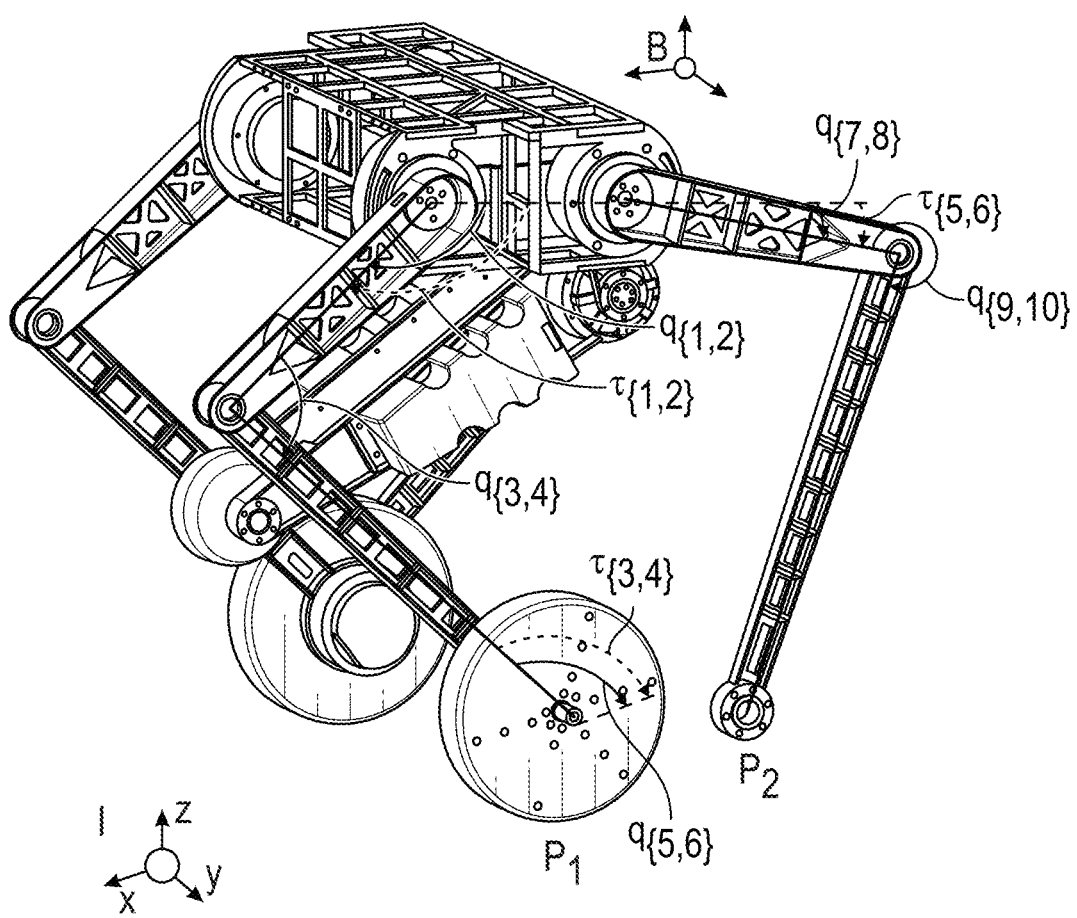
FIG. 3 illustrates a labeling schematic diagram corresponding to a robot according to an embodiment of the present disclosure.

For example, as illustrated in FIG. 3, the complex robot 100 illustrated in FIG. 1 may be labeled in a generalized coordinate system of the robot. For ease of labeling, in FIG. 3, the centers $P_1$ and $P_2$ of the driving wheels are illustrated as two separate points. It is to be understood by a person skilled in the art that $P_1$ and $P_2$ are substantially the same point.

In an example, in FIG. 3, the parameters of each joint involved in the wheel legs are respectively identified by $q_{\{\cdot,\cdot\}}$ and $\tau_{\{\cdot,\cdot\}}$, where $q_{\{\cdot,\cdot\}}$ identifies a rotation angle of a joint, and $\tau_{\{\cdot,\cdot\}}$ identifies torque of a joint. For example, $q_{\{1,2\}}$ identifies a rotation angle of a joint between a first link of the left wheel leg of the robot and the base portion, and $\tau_{\{1,2\}}$ identifies rotation torque of the joint between the first link of the left wheel leg of the robot and the base portion. Although not illustrated in FIG. 3, angle and rotation torque of a tail joint may be set correspondingly.

An embodiment of the present disclosure proposes a whole body dynamic control method based on adaptive dynamic programming, and in some embodiments in combination with a whole body dynamic technology. The whole body dynamic control method uses output of the robot controller calculated based on the adaptive dynamic programming as a reference parameter for the whole body dynamic control, to improve the overall flexibility of motion of the robot.

According to one aspect of the present disclosure, an embodiment of the present disclosure, and in some embodiments in combination with an optimal control technology, proposes a policy iteration method based on adaptive dynamic programming. The policy iteration method based on adaptive dynamic programming can dynamically iterate a linear equilibrium parameter matrix in the controller under the condition that the dynamic parameters of the robot are changed to obtain a controller corresponding to the dynamic characteristics of the robot after the parameters are changed. The controller enables the robot to move along the target trajectory with the optimal control effect in the equilibrium state even if the dynamic parameters of the robot are changed.

In step S201, the first controller is used to control motion of the robot, and obtain motion state data and control data of the robot during the motion process.

In an example, precise dynamic characteristics of the robot are unknown, or, merely part of the dynamic characteristics of the robot may be roughly determined. In addition, the dynamic characteristics of the robot may involve some variable parameters. Taking the robot 100 as an example, as the robot 100 moves, the height of the center of gravity of the robot 100 may change. In addition, if an object is handled by the robot 100, the mass of the robot 100 may change accordingly. Whether the height of the center of gravity or the mass changes, the dynamic energy, potential energy, momentum and other characteristics of the robot may be changed during the motion process of the robot, to change the dynamic model corresponding to the robot 100. Although the present disclosure is described merely with the height of the center of gravity and the mass as examples of the variable parameters, it is not limited thereto.

The first controller may be built based on historical motion data of the robot. For example, a processor may obtain historical motion state data and historical control data from the historical motion data of the robot, and the diversity measures of the historical motion state data and the historical control data are higher than a predetermined threshold; calculating the linear equilibrium parameter matrix is using a value iteration manner according to the historical motion state data and the historical control data; building a first controller for controlling motion of the robot based on the linear equilibrium parameter matrix.

In an embodiment, the processor may control the robot to move along a predetermined trajectory, and obtain motion state data and control data during the motion process. The predetermined trajectory may be roughly estimated based on structural characteristics, motion characteristics, and dynamic characteristics of the robot to collect motion data of the robot in various motion situations (scenes) so that the diversity measures of the motion state data and the control data are sufficiently high.

Motion control of the robot may be performed by determining the control torque for controlling each joint of wheel legs of the robot.

For example, the processor adaptively determines the control information for controlling rotation of the driving wheels based on historical motion information of the robot, determines first control information for controlling multiple joints based on the control information for controlling rotation of the driving wheel, the first control information allowing the robot to maintain equilibrium, determines second control information for controlling multiple joints based on a target trajectory of the robot, the second control information causing the robot to move along a target trajectory, and then determines control torque of each joint in the wheel legs of the robot based on the motion constraint condition of the robot, the first control information, and the second control information, so that each joint can be driven based on the control torque to control motion of the robot.

In an example, the linear equilibrium parameter matrix of the first controller may be a stable initial gain matrix. The control force provided by the controller at a moment may be negatively correlated to the product of the linear equilibrium parameter matrix and the motion state data of the robot at the moment. For example, the controller may have a $u(t)=-Kx(t)$ form, where K is a linear equilibrium parameter matrix corresponding to the robot, $u(t)$ corresponds to at least one of a control force or torque outputted by the controller at a moment t, and $x(t)$ corresponds to motion state data of the robot at the moment t. Taking the robot 100 described in FIGS. 1 to 4 as an example, the robot 100 includes at least: wheel legs with multiple joints, a base portion connected to the wheel legs and driving motors for controlling driving wheels in the wheel legs. Correspondingly, the motion state data includes: a pitch angle of the base portion, a pitch angular velocity of the base portion, and linear velocities of the driving wheels. The control data includes: output torque of the driving motors. Correspondingly, since both the motion data and the control data may be collected discretely by means of relevant measuring instruments, both the motion state data and the control data correspond to multiple discrete consecutive moments or to multiple consecutive time intervals.

The first controller may be a non-optimal controller. The non-optimal controller is, for example, a controller that may merely cause the robot 100 to stumble along the target trajectory. For example, the first controller as the non-optimal controller may be a controller corresponding to simplified dynamic characteristics. For example, for a precise dynamic model corresponding to a complex wheel-legged robot, the dynamic model may be simplified to an equivalent dynamic model including merely the driving wheels and the base portion.

As an example, a first controller may be used to control the robot to move in an equilibrium-like state, for example, under the control of some first controllers, the robot may swing left and right at an equilibrium point with a certain amplitude. For example, if a robot whose dynamic characteristics are unknown is controlled under the control of the first controller to move in an equilibrium-like state, the output of the first controller may be used as control data. If the robot is controlled to move by a remote controller of an experimenter, the control data may be obtained by collecting the output of the controller on the real robot (for example, detecting the driving force of the driving wheel). The present disclosure does not limit the manner in which the control data is obtained.

As another example, the first controller may also be a PID controller or the like. In some cases, the linear equilibrium parameter matrix of the first controller may even be an arbitrary stability control gain matrix. Furthermore, the robot may be controlled to travel for a certain distance directly and randomly according to any control data, and the control data and the motion state data before the robot completely loses equilibrium (for example, topples) may be intercepted as the motion state data and the control data obtained in step 201. The present disclosure does not limit specific design schemes of the first controller as long as the first controller may control the robot to not completely lose equilibrium.

As an example, one or more first controllers obtained using a value iteration scheme (or algorithm) may also be used to control the robot to move, and an exemplary implementation of this scheme will be described in detail later. For example, the first controller may be determined using a value iteration scheme when the variable parameter is at a first value. Determination of the first controller using the value iteration scheme may be achieved offline. For example, the variable parameter is made to be the height of the robot, and the first value of the variable parameter is made to be 0.38 m, and the second value of the variable parameter is made to be 0.5 m. When the height of the robot 100 is 0.38 m, an optimal controller for controlling the robot to walk straight may be determined using a value iteration scheme, and the controller is used as a first controller. Then, the height of the robot 100 is adjusted to be 0.5 m by changing a joint angle. Then, the first controller is used continuously to control the robot with the adjusted height to travel for a period of time or a distance, and motion state data and control data are correspondingly collected. Subsequently, the motion state data and the control data are used as training data for the second controller to obtain an optimal controller when the variable parameter is at the second value.

It is to be understood by a person skilled in the art that the first value and the second value described above are merely examples, and the present disclosure is not limited thereto. Although the value iteration scheme is able to determine a first controller adapted to a robot with a height of 0.38 m, in a case that the height of the robot changes, a second controller adapted to the robot with the changed height needs to be recalculated offline. Offline calculation may be time-consuming and may lead to an interruption in the motion of the robot.

In order to reduce the amount of calculation, the second controller may be built by using the policy iteration scheme in steps S202 to S203. In the step S202, the linear equilibrium parameter matrix of the first controller is updated in a policy iteration manner according to the motion state data and the control data. In the step S203, the second controller corresponding to dynamic characteristics of the robot is built based on the updated linear equilibrium parameter matrix.

For example, a robot under the control of the second controller may have a better control effect during the motion process relative to a robot under the control of the first controller. For example, the swing amplitude of the robot around the equilibrium point under the second controller corresponding to the dynamic characteristics of the robot may be smaller than that under the first controller. For another example, compared to the robot under control of the first controller, the robot under control of the controller can converge to the vicinity of the equilibrium point faster, or has smaller oscillation, faster control velocity, smaller overshoot, or smaller steady-state errors and so on. Alternatively, in some cases, the arbitrary controller and the controller have the same control effect, but the control input of the controller is smaller. The present disclosure does not limit in this regard.

For example, the traveling robot 100 is described as an example. The robot 100 in an equilibrium state may be in a stable equilibrium state in a linear motion dimension and a rotation motion dimension. For example, the robot 100 in the equilibrium state may maintain the same or very similar state to a state defined by the equilibrium point during the motion process, or may return to the state defined by the equilibrium point with the fastest velocity or minimum energy consumption during the motion process. The state defined by the equilibrium point may be such that the robot 100 is in a state in which a pitch angle is zero, an angular velocity corresponding to the pitch angle is zero, and a linear velocity is at the target velocity. For example, the posture of the robot 100 is a state of being vertically upward, and the robot 100 does not have a velocity in the rotation motion dimension but merely has a target velocity in the linear motion dimension, that is, the robot 100 is in the state defined by the equilibrium point.

The robot 100 in the equilibrium-like state is in a state defined in the vicinity of the equilibrium point during the motion process. For example, the robot 100 in the equilibrium-like state may be in an intermediate state transiting from the stable equilibrium state to the unstable equilibrium state in the linear motion dimension and the rotation motion dimension. The robot 100 in the equilibrium-like state may require the driving wheel to provide a large force and torque during the motion process to ensure that it will not fall. For example, the robot 100 may tilt left and right, and the robot 100 has a velocity in the linear motion dimension while also having a velocity in the rotation motion dimension, that is, the robot 100 is in a state defined by an equilibrium-like point. Notably, the robot 100 in the equilibrium-like state herein may also be in a nearly unstable equilibrium state in the linear motion dimension or the rotation motion dimension at some moments in motion, as long as the robot may be restored to a state capable of normally traveling by the driving force of the driving wheels 104.

As an example, if the robot 100 moves straight merely under the control of the driving wheels 104, the robot 100 in an equilibrium state may always move straight at a uniform speed with a vertically upward posture, that is, the central axis of the base portion of the robot 100 in the unstable equilibrium state may be perpendicular to the horizontal line at all times and does not have a velocity or acceleration in the rotation motion dimension. The base portion of the robot 100 in the equilibrium-like state may have a tilt angle (pitch angle) and at least one of a velocity and an acceleration in the rotation motion dimension.

In an embodiment of the present disclosure, the robot may be first made to travel for a period of time or a section of trajectory under the control of the first controller, and the motion state data and the control data corresponding to the period of time or the trajectory may be collected as training data. Even if the dynamic characteristics of the robot 100 are unknown or inaccurate or the dynamic characteristics change during the motion process, and the first controller is a non-optimal controller, the embodiment of the present disclosure may determine the second controller as an optimal controller through policy iteration. The embodiment of the present disclosure uses a value-driven policy iteration scheme to calculate a linear equilibrium parameter matrix to build a second controller. The control effect of the second controller will be better than that of the first controller.

The built second controller is able to converge to a controller corresponding to an optimal solution to the linear quadratic regulation problem. The controller corresponding to the optimal solution to the linear quadratic regulation problem is also the controller corresponding to the precise dynamic characteristics of the robot. The controller corresponding to the optimal solution to the linear quadratic regulation problem may minimize the cost functional of the robot during the motion process, so that the robot may travel along the target trajectory with the optimal control effect in an equilibrium state. The policy iteration scheme and the calculation scheme of the linear equilibrium parameter matrix will be further described later.

Thus, the amount of training data of the embodiment of the present disclosure is much smaller than the amount of data required by a related reinforcement learning algorithm. Further, according to the embodiment of the present disclosure, the trained controller gradually converges to the controller corresponding to the optimal solution to the linear quadratic regulation problem as the learning step increases, so that stability of a close-loop system may be improved and/or guaranteed, the training process is greatly simplified, and additional limitations on training data are not required, so as to simplify the design process of the controller for the robot. In addition, the embodiment of the present disclosure may directly perform data collection on a real robot, and the controller obtained by training may be directly applied to the real robot. The embodiment of the present disclosure does not need to perform data collection in a simulator based on a physical engine, and also eliminates some problems caused by the migration of data in the virtual world to the real world. For example, referring to FIGS. 1 to 4, for any robot with a base portion, generalized coordinates of the robot may be characterized by $q=[q_{fb}^T, q_J^T]^T$. The generalized coordinates $q=[q_{fb}^T, q_J^T]^T$ of the robot includes the posture $q_{fb} \in \mathbb{R}^3 \times SO(3)$ of the base portion and $n_j$ joint angles $q_J = [q_1, q_2, \ldots, q_{n_j}]^T$. For the robot illustrated in FIG. 1 and FIG. 3, the generalized coordinates q of the robot may also be obtained similarly, where $n_j=12$ and $q_i$ may be one of any joints identified with $q_{\{...\}}$ in FIG. 3.

Based on the generalized coordinates q of the robot, a generalized velocity set $\dot{q}=[\dot{q}_{fb}{}^T, \dot{q}_J{}^T]^T$ and a generalized acceleration set $\ddot{q}=[\ddot{q}_{fb}{}^T, \ddot{q}_J{}^T]^T$ of joints of the robot may be determined. It is to be understood by a person skilled in the art that $\dot{q}_{fb}$ and $\ddot{q}_{fb}$ represent an instantaneous angular velocity and an instantaneous angular acceleration of the robot body, respectively. Similarly, the joint torque may also be identified using $\tau=[\tau_1, \tau_2, \ldots, \tau_8]^T$.

Thus, a general dynamic model as illustrated in the following equation (1) may be constructed.

$$M(q)\ddot{q}+C(q,\dot{q})=S^T\tau+J_f^T f+J_\lambda^T \lambda \qquad (1)$$

where $M(q)\in \mathbb{R}^{(6+n_j)\times(6+n_j)}$, and $M(q)$ is used to represent the mass matrix of the robot. $C(q, \dot{q})\in \mathbb{R}^{(6+n_j)}$ is used to represent gravity, centrifugal, and Coriolis force terms of the robot. $S=[0_{n_j\times 6}\ I_{n_j\times n_j}]$, the matrix S is used to select an active joint from all joints, where if the element value of an element in S is 0, it means that it is a joint without drive, and if the element value is not 0, it indicates that it is an active joint. f is a generalized force provided by the ground at a contact point when the robot is in contact with the ground. $J_f\in \mathbb{R}\beta^{3n_c\times(n_j+6)}$, $J_f$ is a concatenated contact Jacobian matrix for f. $\lambda$ is a close-loop force of the front leg acting on the back leg. $J_\lambda\in \mathbb{R}\beta^{3m_\lambda\times(n_j+6)}$, $J_\lambda$ is a concatenated contact Jacobian matrix for $\lambda$. $n_c$ is the number of contact points between the driving wheels and the ground. Considering close-loop constraints (that is, on a real robot, each joint of the robot is to be fixedly connected), $n_\lambda$ is the number of contact points between open-loop links. For the robot illustrated in FIG. 1 and FIG. 3, $n_c=2$ and $n_\lambda=2$. In an example, the wheel legs of the robot are a five-link mechanism. The number of contact points (for example, between $P_1$ and $P_2$ points in FIG. 3) between the open-loop links of the close-loop constraint of the five-link mechanism is two.

Figure 4:
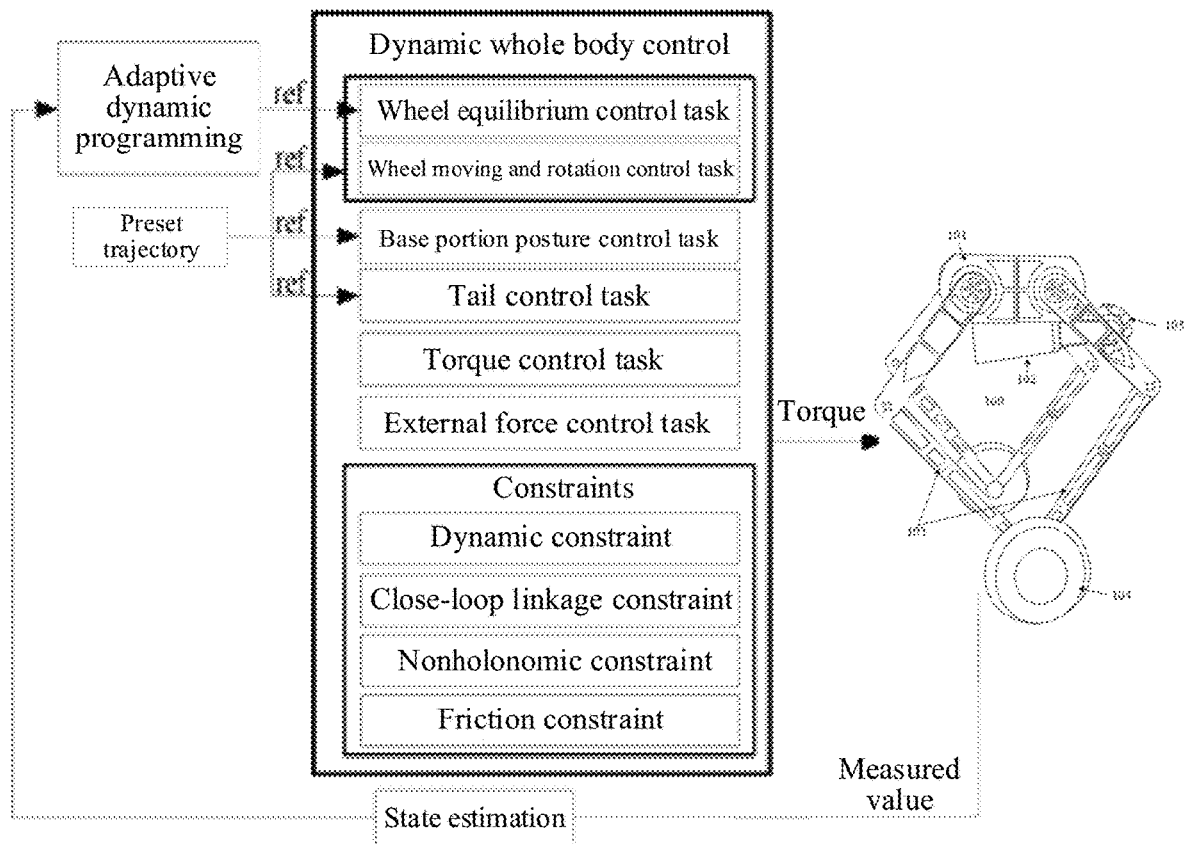
FIG. 4 illustrates a control architecture diagram corresponding to a robot according to an embodiment of the present disclosure.

On the basis of obtaining the robot configuration, the corresponding control architecture and control tasks may be set for the robot in consideration of the traveling process of the robot, and the control architecture and the control tasks can be described by mathematical language. The above control architecture and the control tasks are further described below with reference to FIG. 4. FIG. 4 illustrates a control architecture diagram corresponding to a robot according to an embodiment of the present disclosure. Taking the robot labeled in FIG. 3 as an example, FIG. 4 illustrates multiple exemplary control tasks for the robot and the association between the control tasks. Combination and association of these exemplary control tasks is further referred to as corresponding dynamic whole body dynamic control of the robot.

FIG. 4 further illustrates another example, in which a measured value is used to estimate the motion state of the robot, and then the value after the state estimation is inputted to a data processing module for adaptively determining the control information for controlling rotation of the driving wheels, so that the data module may learn the corresponding measured value at each moment more quickly to more efficiently calculate an optimal controller for controlling rotation of the driving wheels.

The control information for controlling rotation of the driving wheel may be the acceleration of the driving wheel or the torque of the driving wheel. Although there is not much difference between these two physical quantities as control information to control rotation of the driving wheel in a mathematical sense, not both of them can be accurately measured in an actual physical system. Therefore, a person skilled in the art can select a physical quantity which has a better data test effect and is more in line with the model for subsequent calculation and iteration according to the specific situation in an experiment.

For example, the corresponding dynamic whole body dynamic control of the robot may be described as controlling each joint of the robot with the goal of minimizing the total input energy to each joint and minimizing the error from the target trajectory while ensuring the equilibrium of the robot. For example, the dynamic whole body dynamic control target $\underset{(\tau,f,\lambda)}{\arg\min} z$ for the robot labeled in FIG. 3 may be expressed in equation (2).

$$\underset{(\tau,f,\lambda)}{\arg\min} z = \|\ddot{q}^{des}-\ddot{q}\|_{W_q}^2 + \|\tau^{des}-\tau\|_{W_\tau}^2 + \|f\|_{W_f}^2 + \|\lambda\|_{W_\lambda}^2 \qquad (2)$$

where $\ddot{q}^{des}$ is a vector of a set of accelerations set for all joints by the target trajectory. $\ddot{q}$ is a vector of a set of accelerations of all joints during the motion process. $\tau^{des}$ is a vector of a set of torques for all joints by the target trajectory. $\tau$ is a vector of a set of torques of all joints in an actual motion process. f is a generalized force provided by the ground at a contact point when the robot is in actual contact with the ground. $\lambda$ is a close-loop force of the front leg acting on the back leg during the motion process of the robot. The subscripts $W_q$, $W_\tau$, $W_f$, $W_\lambda$ identify weight coefficient matrices that need to be multiplied in calculating the norm of the equation (2) by $\ddot{q}$, $\tau$, f and $\lambda$ respectively.

As illustrated in FIG. 4, the controller determined by adaptive dynamic programming will be used to control the driving wheels illustrated in FIG. 1 and FIG. 3. The motion state and the dynamic state of the driving wheel will correspondingly provide input reference or input limit to each control task, thus changing the posture and the equilibrium state of the robot. Correspondingly, in order to prevent the robot from losing equilibrium, the active joints (for example, $q_{\{1,2\}}$ and $q_{\{7,8\}}$) in FIG. 3 will rotate under the combined action of the driving wheel (for example, $q_{\{5,6\}}$), the joints without drive (for example, $q_{\{3,4\}}$ and $q_{\{9,10\}}$) and the joint torque (for example, $\tau_{\{1,2\}}$ and $\tau_{\{5,6\}}$) to adjust the posture of the robot so that the robot maintains equilibrium.

As illustrated in FIG. 4, rotation of the driving wheel under the control of the adaptive dynamic programming controller will provide an input reference Ref to at least one of a wheel equilibrium control task, a wheel traveling and rotation control task. The target trajectory will provide an input reference to the wheel traveling and rotation control task, a base portion posture control task, and a tail control task. Although the driving wheel and the target trajectory do not directly provide an input reference to other control tasks (for example, a torque control task and an external force control task), considering that each control task often needs to control the same robot component (for example, a main wheel, a link component, a joint hinge), the control effects of these control tasks are often limited by the driving wheel and the target trajectory.

With further reference to FIG. 4, the motion of the robot is also limited by various constraints, for example, the limitations such as the maximum torque that each joint may provide, and the mechanical configuration. Four example constraints, a dynamic constraint, a close-loop linkage constraint, a nonholonomic constraint and a friction constraint, are given in FIG. 4.

As an example, the dynamic model illustrated in equation (1) may be used as an example of a dynamic constraint to limit the range of energy change during the motion process of the robot. It is to be understood by a person skilled in the art that the limitations of the dynamic model are not limited thereto. For example, in order to facilitate analysis of the energy change of the robot, a simplified dynamic model may be established for the robot to simplify the dynamic model limitation corresponding to equation (1) in the dynamic whole body dynamic control.

As another example, equation (3) illustrates an example of a close-loop linkage constraint for the robot in FIG. 3. It is to be understood by a person skilled in the art that the close-loop linkage constraint may also be illustrated in other ways. The present disclosure is not limited thereto.

$$J_\lambda \ddot{q} + \dot{J}_\lambda \dot{q} = 0 \quad (3)$$

where $J_\lambda^T = [J_{P_1,l}^T - J_{P_2,l}^T J_{P_1,r}^T - J_{P_2,r}^T]^T$, and $J_{P_2}$ are Jacobian matrices corresponding to points $P_1$ and $P_2$, respectively. The subscripts $J_{\cdot,l}$ and $J_{\cdot,r}$ identify the left wheel leg and the right wheel leg of the robot, respectively.

As yet another example, equation (4) illustrates an example of one type of nonholonomic constraint for the robot in FIG. 3, assuming that the wheel purely rolls and is in contact with the ground, with no slip or sliding in the radial and axial directions of the wheel. It is to be understood by a person skilled in the art that the nonholonomic constraint may also be illustrated in other ways.

$$_B J_w^{(1,3)} \ddot{q}_B + _B \dot{J}_w^{(1,3)} \dot{q} = 0 \quad (4)$$

where $_B J_w^{(1,3)}$ are the x axis and the z axis of the Jacobian matrix of the driving wheel-ground contact point with respect to the base portion.

Continuing the example in FIG. 4, setting of the friction constraint may be based on the assumption: the friction cone at the contact point between the ground and the robot in the actual motion process is approximated as a friction pyramid. In the local coordinate system of the contact force $f_i$ corresponding to each contact point, a friction coefficient $\mu$ is given, and the friction constraint may be expressed as $|f_{i,x}| \leq \mu f_{i,z}$ and $|f_{i,y}| \leq \mu f_{i,z}$.

In addition to the four kinds of constraints illustrated in FIG. 4, a one-sided constraint may be set correspondingly. An example of the one-sided constraint may be $f_{i,z} > 0$.

Control models of various control tasks may be determined correspondingly, subject to the various constraints described above. In an example, the rotation of the driving wheel under the control of the adaptive dynamic programming controller will provide an input reference to the wheel equilibrium control task, while the target trajectory will provide an input reference to the other control tasks. For example, the rotation speed of the driving wheel will have an influence on the posture and the speed of the base portion, and the posture and the speed of the base portion will have an influence on the equilibrium state of the robot.

As an example of a wheel equilibrium control task, to control the motion of the base portion, the desired acceleration $\ddot{q}_{fb}$ of the base portion may be calculated by a PD control law (Proportional Derivative Controller). In one example, at least part of the PD control law is derived based on an input reference for a posture and an input reference for a velocity.

In an example, the input reference for the posture, also referred to as reference posture, indicates: due to rotation of the driving wheel under control of the adaptive dynamic programming controller, the posture of each joint except the joint $q_{\{5,6\}}$ changes. The input reference for the velocity, also referred to as a reference velocity, indicates: due to rotation of the driving wheel under control of the adaptive dynamic programming controller, the velocity of each joint except the joint $q_{\{5,6\}}$ changes.

That is, $\ddot{q}_i^{des}$ in equation (2) may be approximately expressed by using equation (5).

$$\ddot{q}_i^{des} = \begin{cases} k_{q,p}(q_i^{ref} - q_i) + k_{q,d}(\dot{q}_i^{ref} - \dot{q}_i), & i \neq 5, 6, \\ 0, & i = 5, 6 \end{cases} \quad (5)$$

In addition, $\tau_i^{des}$ in equation (2) may be further approximately expressed by using equation (6). In equation (6), it is assumed that the torque of other joints $\tau_i^{des}(i \neq 3,4)$ except the joint $q_{\{5,6\}}$ is approximately zero.

$$\tau_i^{des} = \begin{cases} \tau^{ADP} & i = 3, 4 \\ 0, & i \neq 3, 4 \end{cases} \quad (6)$$

For another example, taking the robot described in FIGS. 1 to 3 as an example, the input reference for the posture includes: the distance from the center of gravity of the robot to the center of the driving wheel connection line projected on the ground (for example, identified by state_com_p). The input references for the velocity include: the velocity derived based on the difference from the center of gravity of the robot to the center of the driving wheel connection line projected on the ground (for example, identified by state_com_v), and the linear velocity of the driving wheel (identified by wheel_x_v). In the above PD control law, at least one of the reference acceleration and the reference torque of the driving wheel may be solved by taking state_com_p, state_com_v, and wheel_x_v as input states.

An embodiment of the present disclosure proposes a whole body dynamic control method based on adaptive dynamic programming, and in some embodiments in combination with a whole body dynamic technology. According to the whole body dynamic control method, the output of the controller of a certain joint of the robot, which is calculated based on the adaptive dynamic programming, is used as a reference parameter for whole body dynamic control, so that the controller of the joint may be matched with the controller of other joints, and the overall flexibility of motion of the robot is improved.

An embodiment of the present disclosure also includes a method for robot motion control using a controller corresponding to the dynamic characteristics of the robot. The robot includes wheel legs including driving wheels and at least one joint, and a base portion connected to the wheel legs. In an example, this method includes: receiving a motion instruction from a second controller, the motion instruction indicating a motion trajectory of the robot; according to the motion instruction, controlling the driving force of the driving wheel by a controller corresponding to the dynamic characteristics of the robot, so that the robot moves smoothly along the target trajectory. The robot under control of the controller corresponding to the dynamic characteristics of the robot is closer to the equilibrium point during the motion process than the robot under the control of a first controller.

An embodiment of the present disclosure also includes a method for controlling a robot. In an example, this method includes: receiving a motion instruction from a first controller, the motion instruction indicating a motion trajectory of a robot; controlling the driving force of a driving wheel according to the motion instruction so that the robot moves under the control of the first controller and motion state data and control data during the motion process are obtained; based on the motion state data and the control data, building a second controller corresponding to the dynamic characteristics of the robot in a policy iteration manner, and controlling the driving force of the driving wheels by using the second controller to cause smooth motion of the robot. The robot under control of the second controller has a better control effect during the motion process, for example, closer to the equilibrium point, than the robot under the control of any other controller.

Therefore, the method for controlling the robot in the embodiment of the present disclosure enables a robot with unknown dynamic characteristics to learn data during the motion process, and gradually improves/generates a controller corresponding to the dynamic characteristics of the robot, and finally realizes smooth motion. Since the control input of the first controller may be used to control motion of the robot for a period of time to obtain training data, in such cases, the embodiment of the present disclosure enables improvement of a non-optimal controller in a case that the dynamic characteristics are unknown or the dynamic characteristics are changed, and a second controller corresponding to the (precise) dynamic characteristics of the robot is generated. That is, the embodiment of the present disclosure may enable the robot to be flexibly controlled without a precise dynamic model.

Figure 5:
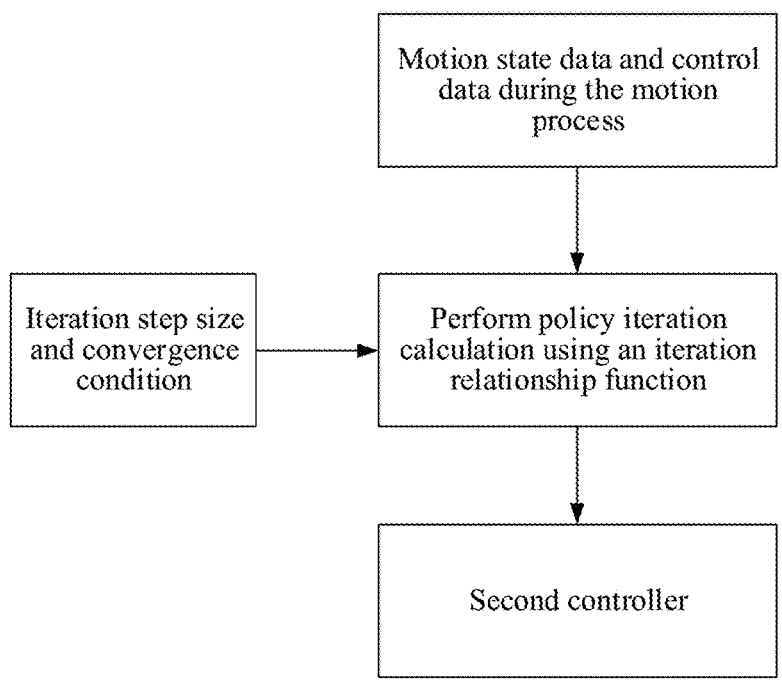
FIG. 5 illustrates an exemplary flowchart of a method for building a controller for a robot according to an embodiment of the present disclosure.

For example, with further reference to the example of FIG. 5, the motion process of the robot 100 may be mathematically viewed as a continuous-time linear system. It is assumed that a controller corresponding to the optimal solution to a linear quadratic regulation problem exists for the robot 100, the controller is capable of minimizing the cost functional corresponding to the motion process of the robot. For example, the controller corresponding to the optimal solution to the linear quadratic regulation problem may minimize the cost of the robot being near the equilibrium point and the robot may travel along the target trajectory with minimum energy consumption.

As an example, the linear quadratic regulation problem may be defined by equation (7), which indicates that, in the case of $\dot{x}=Ax+Bu$, a controller that may minimize the cost functional J of a continuous-time linear system is solved. Similarly, $A \in \mathbb{R}^{n \times n}$ and $B \in \mathbb{R}^{n \times 1}$ $$\min J = \int_0^\infty x^T(t)Qx(t) + Ru^2(t)dt \quad (7)$$

$$\text{s.t. } \dot{x} = Ax + Bu,$$

where J is the cost functional of the continuous-time linear system, Q is a real symmetric and positive semi-definite matrix, $Q \in \mathbb{R}^{n_p \times n_p}$. $(A, \sqrt{Q})$ is observable, and R>0. x is related to a robot configuration and a wheel equilibrium task. For example, referring to the example in FIG. 4, if a controller needs to be determined for a driving wheel, then x optionally include a pitch angle, a pitch angular velocity, and a linear velocity of the robot, and u is the sum of the input torques of the two wheels.

According to an optimal control theory, mathematically, the Algebraic Riccati equation (equation (8)) may be taken as the solution to the following linear quadratic regulation (LQR) problem defined by equation (7).

$$A^T P^* + P^* A - \frac{1}{r} P^* BB^T P^* + Q = 0 \quad (8)$$

where u*(t) is a controller corresponding to the optimal solution to the linear quadratic regulation problem, u*(t)=−K*x(t), where $$K^* = \frac{1}{R} B^T P^*,$$

and P* is a matrix meeting $$A^T P^* + P^* A - \frac{1}{R} P^* BB^T P^* + Q = 0.$$

If the precise dynamic characteristics of the robot 100 are known, then matrices A and B in equation (7) and equation (8) are known. In a case that the matrices A and B in equation (7) and equation (8) are known, u*(t) may be correspondingly solved.

However, as described above, in a case that the precise dynamic characteristics of the robot 100 are unknown, or merely part of the dynamic characteristics of the robot 100 may be determined, the above optimal controller u*(t)=−K*x(t) may not be determined in practical applications. Further, P in equation (7) and equation (8) are not linear, making it difficult to solve an accurate P*.

In various aspects of the embodiment of the present disclosure, the above optimal controller u*(t)=−K*x(t) is determined by a policy iteration scheme in a case that the precise dynamic characteristics of the robot 100 are unknown or variable parameters in the dynamic characteristics change, or in a case that merely part of the dynamic characteristics of the robot 100 may be determined. In an example, according to a related theory of policy iteration, it may determine correspondingly:

existence of $K_0 \in \mathbb{R}^{1 \times n}$ is assumed, $K_0$ is a stability control gain matrix. That is, $A - BK_0$ is Hurwitz. Then, if $K_k$ is continuously updated by equation (9), as k tends to positive infinity, $K_k$ will approach to K*, that is, $\lim_{k \to \infty} K_k = K^*$.

$$K_{k+1} = \frac{1}{R} B^T P_k \quad (9)$$

In equation (9), $P_k > 0$, and $P_k$ is a solution to a Lyapunov equation. See Equation (10) for an example of the Lyapunov equation.

$$A_k^T P_k + P_k A_k + K_k^T R K_k + Q = 0 \quad (10)$$

In equation (9) and equation (10), k=0, 1, 2, . . . , $A_k = A - BK_k$. Similar to $K_k$, $\lim_{k \to \infty} P_k = P^*$. Thus, equation (9) and equation (10) describe the relationship among $K_{k+1}$, $K_k$ and $P_k$.

Thus, based at least in part on equation (9) and equation (10) above, a scheme for updating the linear equilibrium parameter matrix of the first controller in a policy iteration manner may be illustratively determined.

For example, the above step S202 may further include: non-linearly combining motion state data and control data corresponding to multiple time intervals to determine a training data set, and determining an iteration relationship function based on the training data set; according to the iteration relationship function, performing multiple policy iterations on the iteration target term to approximate to obtain a linear equilibrium parameter matrix corresponding to the dynamic characteristics of the robot.

Next, the step S202 is explained with the examples described in FIGS. 1 to 4. According to description of FIGS. 1 to 4, the first controller $u_o$ may be used to control the robot to move and collect motion state data and control data corresponding to multiple time intervals. In an example, for a control policy $u=u_o$, the close-loop system may be illustrated by equation (11).

$$\dot{x} = Ax + Bu_0 \quad (11)$$

Then, by equation (9) and equation (10), along the trajectory defined by equation (11), the derivative of $x(t)^T P_k x(t)$ with respect to time may be illustrated in an exemplary manner by equation (12).

$$\frac{d}{dt}(x(t)^T P_k x(t)) = x(t)^T (A^T P_k + P_k A) x(t) + 2u_0 B^T P_k x(t) = \quad (12)$$

$$x(t)^T (A_k^T P_k + P_k A_k) x(t) + 2(K_k x(t) + u_0) B^T P_k x(t) =$$

$$-x(t)^T (Q + K_k^T R K_k) x(t) + 2(K_k x(t) + u_0) R K_{k+1} x(t) =$$

$$-x(t)^T Q_k x(t) + 2(K_k x(t) + u_0) R K_{k+1} x(t)$$

where $Q_k = Q + K_k^T R K_k$.

Further, the motion state data is collected by a sensor at a certain time interval over a period of time and respectively corresponds to the motion state of the robot at each discrete moment over a period of time. Thus, the motion state data and the control data of the first controller may correspond to multiple time intervals in $[t_0, t_r]$. Any time interval t to t+δt in the multiple time intervals may be marked as [t, t+δt], and the duration δt may be determined according to a data collection time interval that may be achieved by the robot sensor.

Referring to FIG. 5, the motion state data and the control data corresponding to multiple time intervals may be respectively nonlinearly combined for building an iteration relationship function. The motion state data and the control data after integral operation will be used as training data to participate in the process of performing policy iteration on the iteration target term in the step S202, to approximate to obtain a linear equilibrium parameter matrix corresponding to the dynamic characteristics of the robot. Notably, the following description is merely an exemplary integral operation and the present disclosure is not limited thereto.

For example, an exemplary equation (13) may be determined by taking the integral of both sides of equation (12) in a time interval [t, t+δt] and rearranging equation (12).

$$x(t+\delta t)^T P_k x(t+\delta t) - x(t)^T P_k x(t) - 2\int_t^{t+\delta t} (K_k x(t) + u_0) R K_{k+1} x d\tau = \quad (13)$$

$$-\int_t^{t+\delta t} x(t)^T Q_k x(t) d\tau.$$

In order to determine variables $P_k$ and $K_{k+1}$, equation (13) may be iterated at multiple time intervals. For example, r is specified to be a large enough integer, and for all i=0, 1, ..., r−1, $\delta t \leq t_{i+1} - t_i$.

According to equation (13), the integral of the motion state data in time between any two adjacent moments t and t+δt may be related to at least one of the following items: a quadratic term of the motion state data at the moment t, a quadratic term of the motion state data at the moment t+δt, a product of the motion state data at the moment t and the motion state data at the moment t+δt, a product of the control data at the moment t and the motion state data at the moment t, a product of the control data at the moment t+δt and the motion state data at the moment t+δt and the like. In an example, the control data at the moment t is control data for controlling the robot to travel using the first controller.

To facilitate further description of the policy iteration process, for a given integer r, an embodiment of the present disclosure defines the following three matrices as example elements in the training data set, a first matrix $\Delta_{xx}$, a second matrix $\Sigma_{xx}$, and a third matrix $\Sigma_{xu}$ in equation (14). where the first matrix $\Delta_{xx} \in \mathbb{R}^{r \times n^2}$ the second matrix $\Sigma_{xx} \in \mathbb{R}^{r \times n^2}$ and $\Sigma_{xu} \in \mathbb{R}^{r \times n}$. Each matrix corresponds to a nonlinear combination of the motion state data and the control data in multiple time intervals, for example, involving integral operation and product calculation.

$$\Delta_{xx} = \left[ x \otimes x \big|_{t_0}^{t_0 + \delta t_0}, x \otimes x \big|_{t_1}^{t_1 + \delta t_1}, \ldots, x \otimes x \big|_{t_r}^{t_r + \delta t_r} \right]^T \quad (14)$$

$$\Sigma_{xx} = \left[ \int_{t_0}^{t_0 + \delta t_0} x \otimes x d\tau, \int_{t_1}^{t_1 + \delta t_1} x \otimes x d\tau, \ldots, \int_{t_r}^{t_r + \delta t_r} x \otimes x d\tau \right]$$

$$\Sigma_{xu} = \left[ \int_{t_0}^{t_0 + \delta t_0} x u_0 d\tau, \int_{t_1}^{t_1 + \delta t_1} x u_0 d\tau, \ldots, \int_{t_r}^{t_r + \delta t_r} x u_0 d\tau \right]$$

where $0 \leq t_0 < t_1 < \ldots < t_r$. The operator $\otimes$ represents a Kronecker product.

For example, for the robot 100 described in FIGS. 1 to 4, any element $x \otimes x \big|_{t_i}^{t_i + \delta t_i}$ in the first matrix $\Delta_{xx}$ corresponds to a product of any two terms of a base portion pitch angle, a base portion pitch angular velocity, and a linear velocity of the driving wheel at a moment $t_i$ and a moment $t_i + \delta_t$, or a difference between quadratic terms of any one term. Any element $\int_{t_i}^{t_i + \delta_t} x \otimes x \, d\tau$ in the second matrix $\Sigma_{xx}$ corresponds to the product of any two terms of the base portion pitch angle, the base portion pitch angular velocity, and the linear velocity of the driving wheel at the moment $t_i$ and the moment $t_i + \delta_t$, or an integral of quadratic terms of any one term. Any element $\int_{t_i}^{t_i + \delta_t} x u_0 d\tau$ in the third matrix $\Sigma_{xu}$ corresponds to the integral of the product of any item of the base portion pitch angle, the base portion pitch angular velocity, the linear velocity of the driving wheel at the moment $t_i$ and the moment $t_i + \delta_t$ and the driving force controlled by the first controller. Configurations of different robots correspond to different matrices, the above is illustrated merely as an example, and the present disclosure is not limited thereto.

Next, for different t, for example, $t=t_0, t_1, \ldots, t_r$, and the system of equations of equation (13) may be written exemplarily in the form of equation (15). It is to be understood by a person skilled in the art that different linear combination ways of training data will correspondingly affect the forms of the built iteration relationship functions. The iteration relationship function (for example, equation (15)) obtained based on equation (13) is given below exemplarily merely, where iteration target terms include a linear equilibrium parameter matrix to be iterated and a solution to a Lyapunov equation with the linear equilibrium parameter matrix to be iterated as a parameter. Of course, the present disclosure is not limited thereto.

$$\Omega_k \begin{bmatrix} vec(P_k) \\ vec(K_{k+1}) \end{bmatrix} = \Xi_k \quad (15)$$

where vec(·) identifies vectorization of a content within a bracket. In addition, $\Omega_k \in \mathbb{R}^{r \times (n^2+n)}$ and $\Xi_k \in \mathbb{R}^r$ may be defined in a form illustrated in equation (16). As described above, k indicates the number of policy iterations, $P_k$ is the solution to a Lyapunov equation in a kth policy iteration, $K_k$ is the linear equilibrium parameter matrix used in the kth policy iteration, and $K_{k+1}$ is the linear equilibrium parameter matrix in the (k+1)th policy iteration.

$$\Omega_k = [\Delta_{xx}, \ -2\Sigma_{xx}(I_n \otimes K_k^T R) - 2\Sigma_{xu}(I_n R)] \quad (16)$$
$$\Xi_k = -\Sigma_{xx} vec(Q_k).$$

In the above conversion process from equation (13) to equation (15), in order to simplify calculation, let $x^T M x = x \otimes x vec(M)$.

Thus, by updating $K_k$ in equation (16) to $K_{k+1}$ in equation (15), the policy iteration scheme makes generation of the optimal controller no longer dependent on model information (A, B). In addition, equation (16) may also collect the data collected online and update the control policy from $K_k$ to $K_{k+1}$ using equation (15). Thus, the data collected in equation (16) may also be reused to use equation (15) for updating $K_k$ for k=0, 1, . . . , 1, and the updating process can be online or offline. Thus, such a policy iteration process may also be referred to as an off-policy iteration.

Furthermore, in order to ensure that a unique pair ($P_k$, $K_{k+1}$) exists to satisfy the requirements of equation (15), a rank condition defined by equation (17) also needs to be satisfied.

$$rank([\Sigma_{xx} \Sigma_{xu}]) = n(n+3)/2 \quad (17)$$

For example, as is known according to $\lim_{k \to \infty} P_k = P^*$, if the difference between solutions $P_k$ and $P_{k+1}$ of Lyapunov equations corresponding to two adjacent policy iterations is smaller than a preset value (for example, an extremely small value), and thus, the iteration target term converges and policy iterations end.

Figure 6:
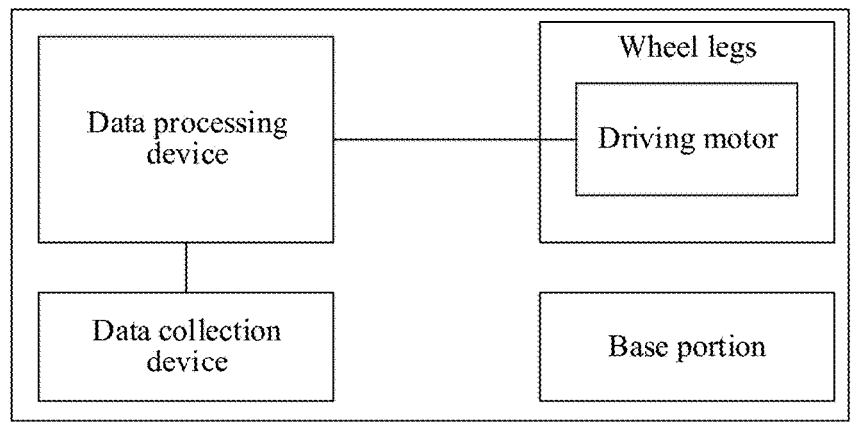
FIG. 6 illustrates another structural view of a robot according to an embodiment of the present disclosure.
Figure 7A:
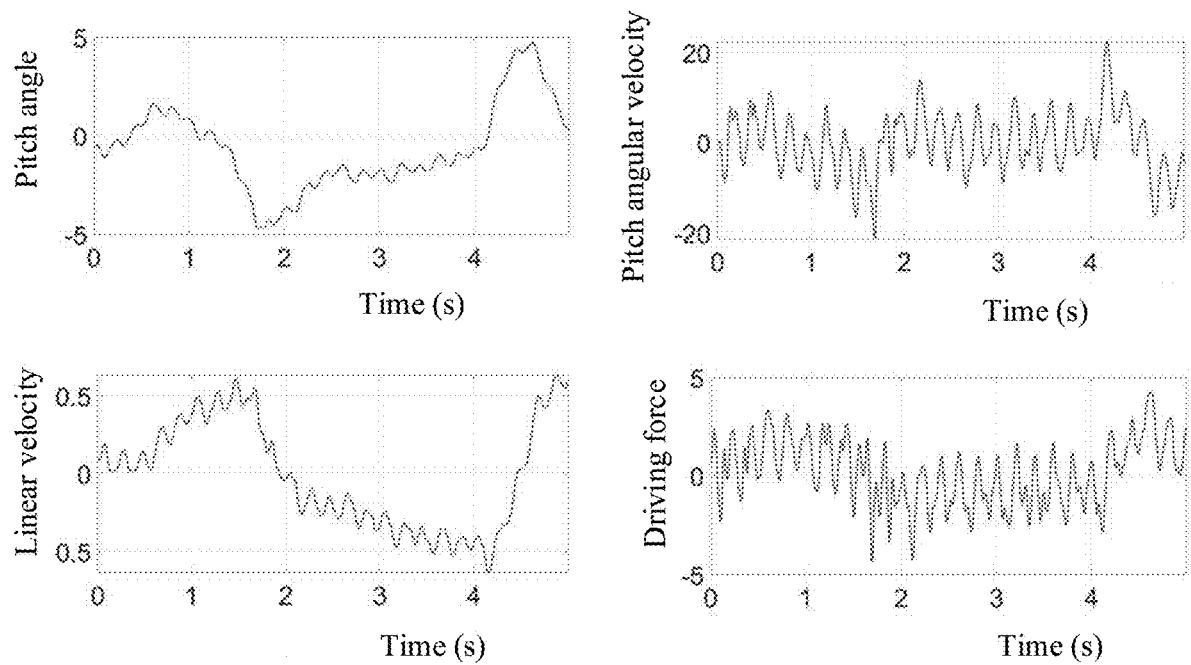
FIG. 7A illustrates motion state data and control data in a motion process of a robot using a first controller to control the robot according to an embodiment of the present disclosure.
Figure 7B:
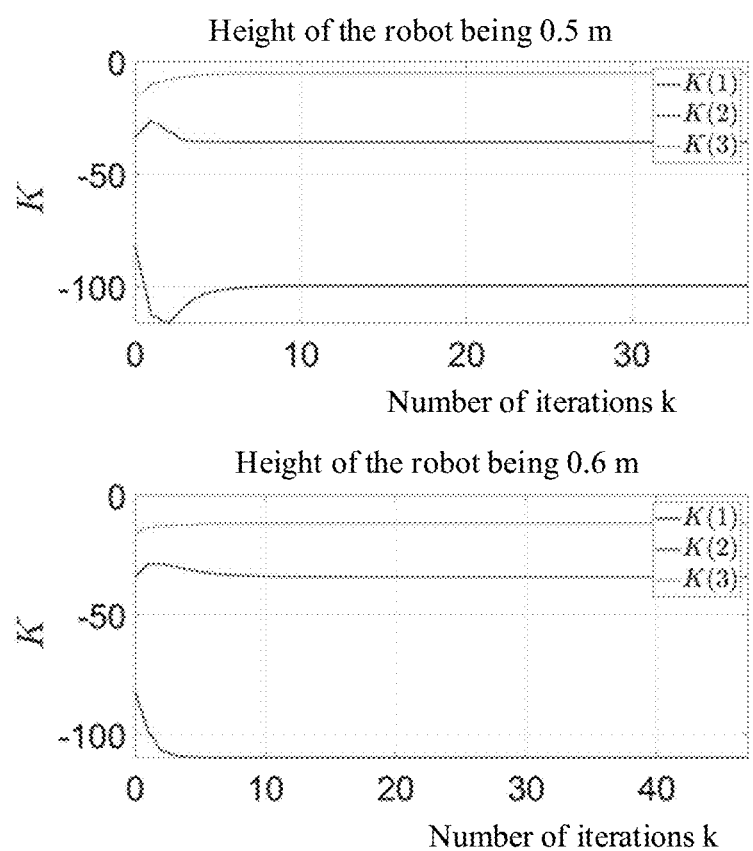
FIG. 7B illustrates a convergence process of a linear equilibrium parameter matrix in a process of building a second controller according to an embodiment of the present disclosure, the base portion heights of the robot being 0.5 m and 0.6 m respectively.
Figure 7C:
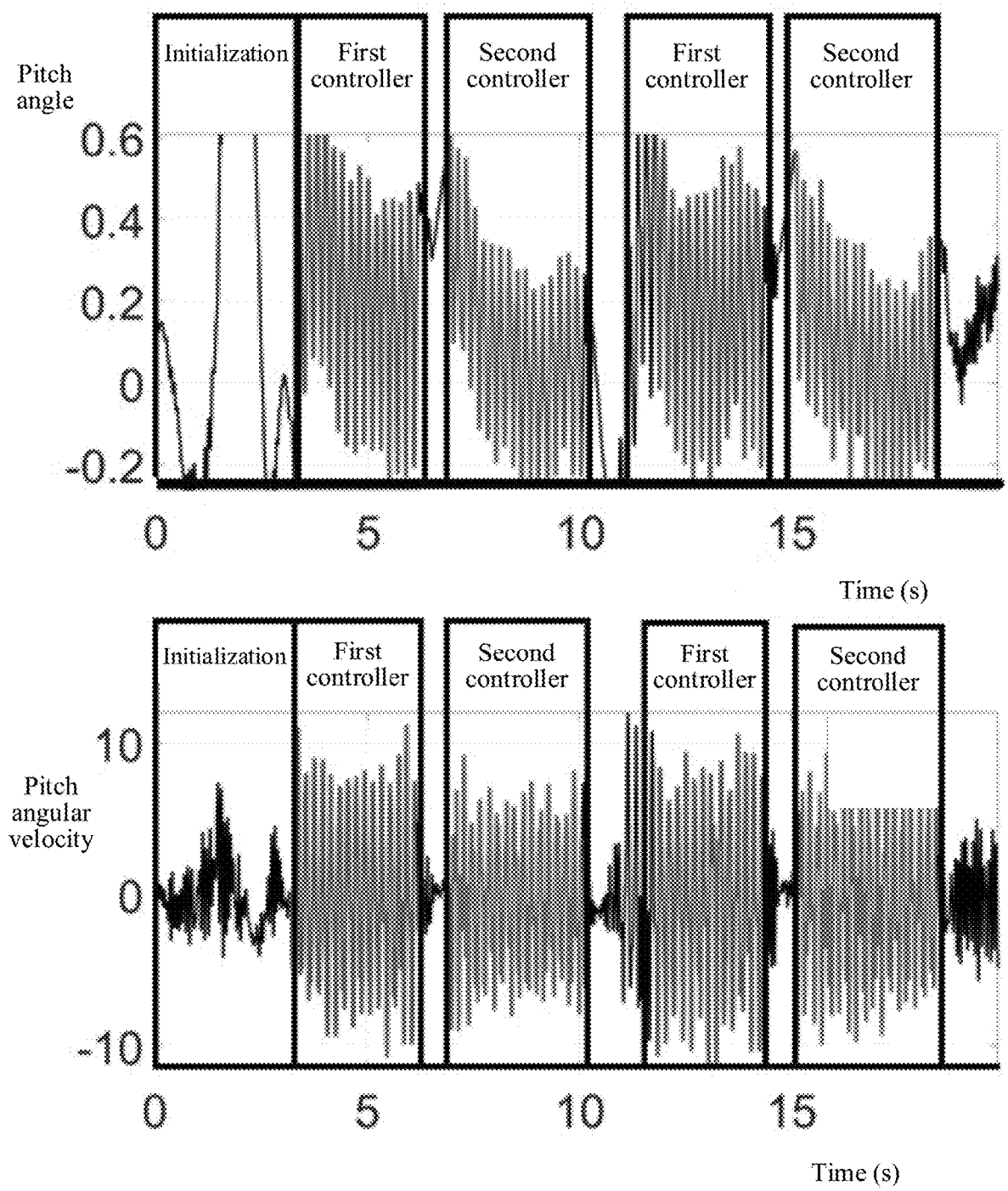
FIG. 7C illustrates motion state data of a robot controlled by the first controller and the second controller respectively to walk straight with the base portion height to be 0.6 m according to an embodiment of the present disclosure.

Next, a method for controlling the robot illustrated in FIGS. 1 to 4 is further described with reference to FIGS. 6 to 7B. FIG. 6 illustrates another structural view of the robot 100. FIG. 7A illustrates motion state data and control data in a motion process of using the first controller to control the robot. FIG. 7B illustrates a convergence process of a linear equilibrium parameter matrix in a process of building a controller according to the dynamic characteristics of the robot, the base portion heights of the robot being 0.5 m and 0.6 m respectively. FIG. 7C illustrates motion state data of the robot controlled by the first controller and the second controller respectively to walk straight with the base portion height to be 0.6 m.

As illustrated in FIG. 6, the robot 100 further includes a data collection device, a data processing device, and a driving motor, in addition to the wheel legs and the base portion described in FIGS. 1 to 4.

The data collection device may be configured to: obtain the motion state data and the control data during the motion process when the first controller controls motion of the robot. For example, the data collector may include: a first sensor for measuring the pitch angle θ of the base portion and the angular velocity $\dot{\theta}$ thereof; a second sensor for measuring rotation angular velocities $\dot{\phi}_l$ and $\dot{\phi}_r$ of a left driving wheel and a right driving wheel. The first sensor may be an inertial measurement unit (IMU in short), which may include a triaxial gyroscope, a triaxial accelerometer, or a triaxial magnetometer. The second sensor may be a motor encoder with a sampling frequency of 200 Hz.

The data processing device may be configured to update the linear equilibrium parameter matrix of the first controller using a policy iteration manner according to motion state data and control data; and build a second controller corresponding to the dynamic characteristics of the robot based on the updated linear equilibrium parameter matrix.

The data processing device may include processing circuitry, such as a microprocessor, a digital signal processor ("DSP"), an application specific integrated circuit ("ASIC"), a field programmable gate array, a state machine, or other processing devices for processing electrical signals received from the sensor lines. Such processing devices may include a programmable electronic device such as a PLC, a programmable interrupt controller ("PIC"), a programmable logic device ("PLD"), a programmable read-only memory ("PROM"), an electronic programmable read-only memory, and the like.

For example, the data processing device may be further configured to further process the data collected by the data collection device. For example, based on the rotation angular velocities $\dot{\phi}_l$ and $\dot{\phi}_r$ of a left driving wheel and a right driving wheel, the data processing device may calculate the linear velocity $$\dot{x} = \frac{\dot{\phi}_l + \dot{\phi}_r}{2} r_w$$

of the robot 100, where $r_w$ is a radius of a driving wheel. In an example, $r_w$=0.1 m the data processing device may further calculate the yaw angular velocity $$\dot{\psi} = \frac{\dot{\phi}_r + \dot{\phi}_l}{w_d} r_w$$

of the robot, where $w_d$ is the robot width, and in some embodiments, $w_d$=0.47 m.

For convenience of explanation, the present disclosure merely gives an example of controlling the driving wheel 104 using the first controller or the second controller, and it is to be understood by a person skilled in the art that the scheme of the present disclosure may also be used to control other components of the robot. Since the driving wheels are merely used to control the forward motion and the backward motion of the robot, for a curved target trajectory, a controller for controlling the yaw angle is also needed to control steering of the robot. To simplify description, the controller for controlling the yaw angle is set to be $\tau_\psi = 0.3(\dot{\psi} - \dot{\psi}_d)$, where $\dot{\psi}_d$ is the target yaw angular velocity. The torque of the left wheel and the torque of the right wheel are then calculated by $$\tau_l = \frac{u r_w}{2} + \tau_\psi$$

and

-continued $$\tau_r = \frac{ur_w}{2} - \tau_\psi.$$

Due to $$\frac{\tau_l + \tau_f}{r_w} = u,$$

the force in the longitudinal direction of the robot is not changed by $\tau_\Omega$. Therefore, the yaw motion does not affect equilibrium of the robot. Thereafter, an angular unit is converted to "degree (deg)" for ease of reading.

Then, the data processing device calculates the control data of the first controller based on the given target trajectory. For convenience of explanation, a controller $u_0$ of a linear equilibrium parameter matrix $K=K_0=[-81.99, -34.96, -16.38]$ is used subsequently as a first controller for explanation. The first controller corresponds to an optimal controller which is obtained in a value iteration manner when the height of the robot is the lowest and the robot 100 may be controlled to walk straight. For example, the lowest of the robot is 0.33 m. Further, the control frequency of the data processing device is optionally 1000 Hz.

As described above, the motion state data and the control data will be used to calculate a first matrix $\lambda_{xx}$, a second matrix $\Sigma_{xx}$, and a third matrix $\Sigma_{xu}$. The data requires continuous signals of x and u, so the data processing means may further use trapezoidal integration to calculate an integral in a case that the first controller and the controller corresponding to the dynamic characteristics of the robot controls the robot 100 to move. The step size of the trapezoidal integration is 0.01 s, which is the same as a sampling period.

As illustrated in FIG. 7A, the height of the robot can be raised to 0.5 m, and the first controller (its linear equilibrium parameter matrix $K=K_0=[-81.99, -34.96, -16.38]$) is used to superimpose the exploration noise $\beta(t)$ to control the robot to walk for 5 seconds, and correspondingly a yaw angle, a yaw angular velocity, a linear velocity and torque of the driving wheel are collected. In an example, the exploration noise is commonly used in the fields of learning and system identification. The exploration noise may trigger various system behaviors to avoid repeated data collection. As an example, the exploration noise $\beta(t)=\sin(10\pi t)+0.4 \cos(6\pi t)$.

As an example, the data processing device may also be further configured with the following instructions to perform calculation of the control data of the first controller and building of the second controller. For ease of presentation, instructions are illustrated in a form of pseudocodes, and a person skilled in the art may calculate the control data of the first controller and build the second controller using any programming language based on the following pseudocodes.

1: A stable initial gain matrix $K_o$ is selected, and let $t_0=0$.
2: $u_0(t)=-K_0x(t)+\beta(t)$ is applied to the robot, where $\beta(t)$ is the noise, the data collection device is used to collect data, and calculate the first matrix to the third matrix until equation (17) is satisfied.
3: k+1 assignment to k is repeated, and equation (15) is used to solve $P_k$ and $K_{k+1}$.
4: Iterations are stopped if $|P_{k+1}-P_k|<\varepsilon$. $\varepsilon$ may be a small preset threshold.
5: $u=-K_kx$ is used as a second controller.

In a case that the data processing device is configured with the above pseudocodes, as illustrated in the upper diagram of FIG. 7B, the linear equilibrium parameter matrix gradually converges to $K=[-99.58-35.87-5.18]$. As illustrated in the left diagram of FIG. 7B, by using merely 37 iterations, $|P_{k+1}-P_k|<\varepsilon=10^{-5}$ may be made.

Similarly, the embodiment of the present disclosure also performs a set of similar experiments with $u=-Kx$ (where $K=[-99.58-35.87-5.18]$) as a first controller and then with the height of the robot raised to 0.6 m, and as illustrated in the lower diagram of FIG. 7B, the linear equilibrium parameter matrix converges to $K=[-109.64, -34.08, -11.58]$. As illustrated in the lower diagram of FIG. 7B, by using merely 47 iterations, $|P_{k+1}-P_k|<\varepsilon=10^{-5}$ may be made. The convergence speed of the policy iteration may be very fast, and thus the embodiment of the present disclosure may be applied to on-line calculation.

FIG. 7C further illustrates a comparison between the control effects of the first controller $u_0(t)=-K_0x(t)$ (where $K_0=[-81.99, -34.96, -16.38]$) and the second controller $u(t)=-K_1x(t)$ (where $K_1=[-109.64, -34.08, -11.58]$). In the comparation experiment, the same sinusoidal noise is added to both the first controller $u_0(t)$ and the second controller $u(t)$ to simulate disturbance acting on the wheel by the outside. As illustrated in the upper diagram and the lower diagram of FIG. 7C, both controllers are robust to noise and have similar control performance. However, as indicated by the smaller magnitude of the second controller in the lower diagram of FIG. 7C, the updated gain $K_1$ has a better control effect in the adjustment of the pitch angular velocity $\dot{\theta}$, so that the traveling state of the robot is more stable.

An embodiment of the present disclosure proposes a value iteration method based on adaptive dynamic programming in combination with an optimal control technology, and the value iteration method based on adaptive dynamic programming is capable of calculating a controller that converges to dynamic characteristics corresponding to a robot in a case that the dynamic characteristics of the robot are unknown. The controller corresponding to the precise dynamic characteristics of the robot, that is, the controller corresponding to the optimal solution to the linear quadratic regulation problem, enables the robot to move along the target trajectory with optimal control effects in an equilibrium state.

Figure 8:
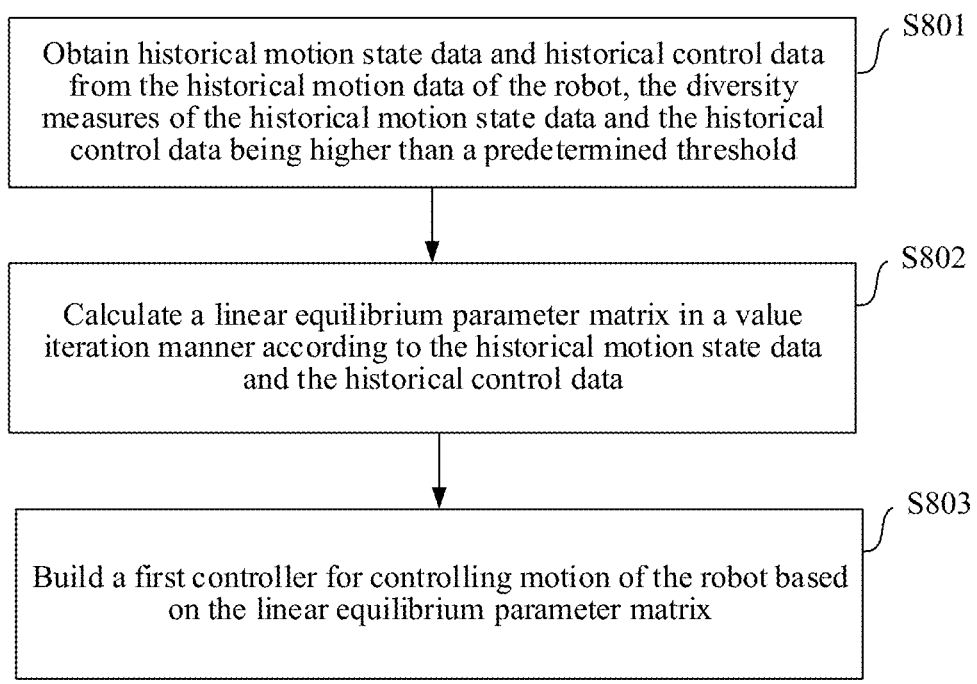
FIG. 8 illustrates an exemplary flowchart of building a first controller according to an embodiment of the present disclosure.

Next, an example of building the first controller corresponding to the dynamic characteristics of the robot is further described with reference to FIG. 8. FIG. 8 illustrates a flowchart of building a first controller based on historical motion data of the robot.

First, the motion process of the robot 100 may be mathematically viewed as a continuous-time linear system. It is assumed that a controller corresponding to the optimal solution to a linear quadratic regulation problem exists for the robot 100, the controller is capable of minimizing the cost functional corresponding to the motion process of the robot. For example, the controller corresponding to the optimal solution to the linear quadratic regulation problem may minimize the cost of the robot being near the equilibrium point and the robot may travel along the target trajectory with minimum energy consumption.

As an example, as described above, equation (7) and equation (8) have been set forth. If the precise dynamic characteristics of the robot 100 are known, then matrices A and B in equation (7) and equation (8) are known. In a case that the matrices A and B in equation (7) and equation (8) are known, $u^*(t)$ may be correspondingly solved.

However, as described above, in a case that the precise dynamic characteristics of the robot 100 are unknown, or merely part of the dynamic characteristics of the robot 100 may be determined, the above optimal controller $u^*(t)=-K^*x(t)$ may not be determined in practical applications. Further, P in equation (7) and equation (8) are not linear, making it difficult to solve an accurate $P^*$.

As described above, according to the related theory of LQR and the related theory of value iterations, with respect to equation (7) and equation (8), if (A, B) is stable and (A, $\sqrt{Q}$) is observable, then for any S≥0, $\lim_{s \to -\infty} P(s)=P^*$, where P(s) is a solution to the following differential Riccati equation (equation (18)) but P* is a solution to equation (8).

$$-\frac{dP(s)}{ds} = A^T P(s) + P(s)A - \frac{1}{R}P(s)BB^T P(s) + Q \quad (18)$$

$$P(t_f) = S$$

That is, as s approaches negative infinity, P(s) will converge to P*.

Based on the above theories, as illustrated in FIG. 8, an embodiment of the present disclosure illustrates a data processing process of building a first controller.

In step S801, historical motion state data and historical control data are obtained from the historical motion data of the robot, and the diversity measures of the historical motion state data and the historical control data are higher than a predetermined threshold.

For example, the robot may be controlled to move along a predetermined trajectory, and the historical motion state data and the historical control data in the historical motion process are obtained. The predetermined trajectory may be roughly estimated based on structural characteristics, motion characteristics, and dynamic characteristics of the robot to collect historical motion data of the robot in various motion situations (scenes) so that the diversity measures of the historical motion state data and the historical control data are sufficiently high (for example, at least higher than a predetermined threshold). In one example, the diversity measures may be characterized by information entropies, which characterize that there are enough non-repeating/non-similar values for both the historical motion state data and the historical control data. In yet another example, the diversity measures may also be characterized by data characteristic quantities.

At this moment, the robot may be controlled to move along a predetermined trajectory by an arbitrary controller. For example, the robot may be manually controlled to move straight at different accelerations regardless of whether the robot is in a state of equilibrium stability motion. According to the robot illustrated in FIGS. 1 to 4, if the driving wheel 104 provides an excessive large acceleration, the robot 100 will quickly topple backward. If the driving wheel 104 provides a too small acceleration, the robot may not reach the destination quickly and may topple forward.

Therefore, in one example of the present disclosure, the historical motion state data and the historical control data satisfying the diversity measures may be collected in the following manner.

Figure 9:
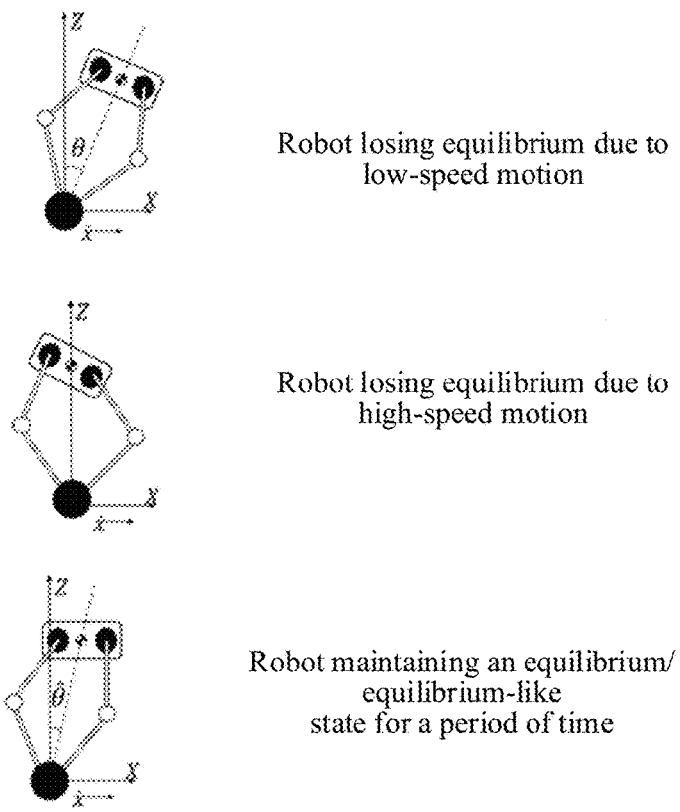
FIG. 9 illustrates an exemplary schematic diagram of a method for building a controller of a robot according to an embodiment of the present disclosure.

As illustrated in FIG. 9, for example, a driving motor may be first controlled to output first torque, so that the robot loses equilibrium due to low-speed motion. For example, the first torque may be a small value, so that in a case that the driving motor is controlled to output the first torque, the center of mass of the base portion of the robot is first raised and then lowered, and the front end of the base portion of the robot comes into contact with the ground when it loses equilibrium. That is, the robot rushes forward from a lowered state (a state in which the center of mass of the base portion is lower), but since the force of the rush is not large enough, the robot raises its head halfway and lowers it.

Then, it is also possible to control the driving motor to output second torque so that the robot loses equilibrium due to high-speed motion. For example, the second torque may be a large value, and in a case that the driving motor is controlled to output the second torque, the center of mass of the base portion of the robot is first raised and then lowered, and the rear end of the base portion of the robot is in contact with the ground when it loses equilibrium. That is, the robot rushes forward from a lowered state (a state in which the center of mass of the base portion is low), but since the force of the rush is excessively large, the robot topples backwards when passing the equilibrium point (the highest point of the center of mass of the base portion).

Then, the driving motor may be further controlled to output third torque, so that the robot maintains an equilibrium state for a period of time. When the driving motor is controlled to output the third torque, the center of mass of the base portion of the robot remains unchanged in height when the robot maintains the equilibrium state. Or the driving motor is controlled to output fourth torque, so that the robot maintains an equilibrium-like state for a period of time, and the robot in the equilibrium-like state is near the equilibrium point during the motion process. When the driving motor is controlled to output the fourth torque, the base portion of the robot shakes back and forth while the robot maintains the equilibrium-like state.

As described above, instructions may be manually inputted to a remote controller and transmitted to the remote controller. After the remote controller receives the instructions, corresponding control data thereof may be determined. Then motion of the robot may be controlled according to the control data of the remote controller, and the motion state data during the motion process can be obtained. In some embodiments, equilibrium of the robot may be difficult to be controlled manually since reaction speeds of human eyes and hands are difficult to satisfy control requirements of the robot. That is, the remote controller is not an equilibrium-like controller, which tends to cause the robot to lose equilibrium.

Next, in step S802, a linear equilibrium parameter matrix is calculated using a value iteration manner on the basis of the historical motion state data and historical control data. In step S803, based on the linear equilibrium parameter matrix, a first controller for controlling the motion of the robot is built. The robot under control of a controller corresponding to the dynamic characteristics of the robot has a better control effect during the motion process compared to the robot under control of the remote controller.

In an example, the controller corresponding to the dynamic characteristics of the robot is a linear controller, and for each moment during the motion process, the control torque provided by the controller corresponding to the dynamic characteristics of the robot is negatively correlated to the product of the linear equilibrium parameter matrix and the motion state data of the robot.

For example, the step S802 in FIG. 8 may further include: performing integral operation on historical motion state data and historical control data in multiple time intervals respectively to build an iteration relationship function; and performing value iterations on an iteration target term according to the iteration relationship function to approximate to obtain a linear equilibrium parameter matrix corresponding to the dynamic characteristics of the robot. In an example, the linear equilibrium parameter matrix K is thus $$\frac{1}{R}B^T P(s),$$

where s tends to negative infinity.

Next, the step S802 is explained with the examples described in FIGS. 1 to 4, respectively. According to the description of FIGS. 1 to 4, the historical motion state data and the historical control data may be the motion state data for training and the control data for training. In an example, the motion state data for training and the control data for training are historical motion state data and control data at a moment when the robot does not topple (for example, the front/rear end or the tail portion of the base portion is not in contact with the ground). That is, equation (19) below is established based on equation (18) at least during the period of motion process.

$$\frac{d}{dt}\left(x(t)^T P(s)x(t)\right) = x(t)^T H(s)x(t) + 2u_0 RK(s)x(t) \qquad (19)$$

where $$H(s) = A^T P(s) + P(s)A$$

and $$K(s) = \frac{1}{R}B^T P(s).$$

Further, the historical motion state data is collected by a sensor at a certain time interval over a period of time, and respectively corresponds to the historical motion state of the robot at each discrete moment over a period of time. Therefore, the historical motion state data and the historical control data of the first controller may correspond to multiple time intervals in $[t_0, t_r]$. Any time interval $t_i$ to $t_{i+1}$ n the multiple time intervals may be marked as $[t, t+\delta t]$, and the duration $\delta t$ may be determined according to a data collection time interval that can be reached by the robot sensor.

For example, an equation (20) can be obtained by taking the integral of both sides of equation (19) in a time interval $[t, t+\delta t]$ for different t (for example, $t=t_0, t_1, \ldots, t_r$)

$$\tilde{\Omega}\begin{bmatrix} vec(H(s)) \\ vec(K(s)) \end{bmatrix} = \Delta_{xx} vec(P(s)) \qquad (20)$$

where $\tilde{\Omega} = [\Sigma_{xx}, 2\Sigma_{xu}(I_n R)]$. Expressions for $\Delta_{xx}, \Sigma_{xx},$ and $\Sigma_{xu}$ have been given in equation (14). Thus, by continually iteratively solving equation (20) and updating equation (18), a linear equilibrium parameter matrix K* may be generated by value iterations, provided that a rank condition is satisfied and there is a unique pair of (H(s), P(s)), and the whole process is no longer dependent on model information (A, B). That is, the value iterations may be ended in a case that an iteration target term converges in a value iteration process; then, a linear equilibrium parameter matrix corresponding to the dynamic characteristics of the robot is rebuilt according to the converged iteration target term.

As described above, according to the embodiment of the present disclosure, merely by collecting the historical motion state data and the historical control data of the robot with unknown dynamic characteristics before losing equilibrium (toppling), and integrating the historical data, from the first matrix to the third matrix are built as the training data. Thus, the amount of the training data of the embodiment of the present disclosure is much smaller than the amount of data required by a related reinforcement learning algorithm. The embodiment of the present disclosure also correspondingly builds an iteration relationship function (for example, equation (20)) such that the target iteration terms (for example, P(s), K(s) and H(s)) gradually converge as a learning step increases. Moreover, the converged target iteration term may obtain a controller, the controller converges to a controller corresponding to the optimal solution to the linear quadratic regulation problem, so that the stability of the close-loop system may be improved and/or guaranteed, and the training process is greatly simplified. The whole process does not require additional limitations on the training data, to simplify the design process of the controller of the robot.

Further, the processor may further process the data collected by the data collection device. For convenience of explanation, the present disclosure merely gives an example of controlling the driving wheel 104, and it is to be understood by a person skilled in the art that the scheme of the present disclosure may also be used to control other components of the robot. Then, the data processing device sets control data for training based on the given target trajectory. As with reference to FIG. 3, the present disclosure is not limited to the specific control laws of the controller used for training. In order to explain the non-limitation of the present disclosure on the controller used for training, an experimenter later manually controls the motion of the robot to extract motion state data and control data as an example for explanation. Further, the control frequency of the data processing device is 1000 Hz.

As described above, the motion state data and the control data will be used to calculate $\Delta_{xx}, \Sigma_{xx}, \Sigma_{xu}$. The data requires continuous signals of x and u. The motion data is collected by adopting a manner similar to FIG. 7A, for example, with the height l=0.33 m of the base portion of the robot 100, an instruction is inputted manually by using the remote controller, to determine the data of motion of the robot controlled by the remote controller. In an example, as the experimenter may not accurately know the dynamic characteristics of the robot 100, manual control of the robot may often cause the robot to topple due to the fact that the controller of the robot may not be accurately and timely adjusted.

Figure 10:
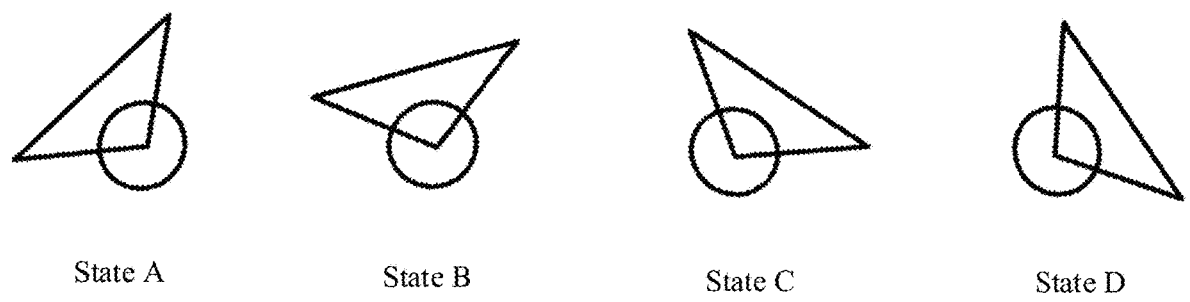
FIG. 10 illustrates a schematic process diagram of collecting motion state data and control data of a robot according to an embodiment of the present disclosure.

The collected motion state data may be further processed to obtain a controller corresponding to the dynamic characteristics of the robot as soon as possible. An example experiment using a data iteration scheme to calculate the controller corresponding to the dynamic characteristics of the robot is illustrated below. As illustrated in FIG. 10, the minimum height of the robot is 0.33 m. A motion instruction is given manually directly by the remote controller to indicate the torque of the driving wheel. In this experiment, as the torque of the driving wheel is increased, the robot starts from an initial state (illustrated in state A), and moves using the driving wheel (illustrated in state B and state C), and finally topples (state D). Since, eventually, the robot loses equilibrium, the remote controller in this case is not an equilibrium-like controller.

Figure 11:
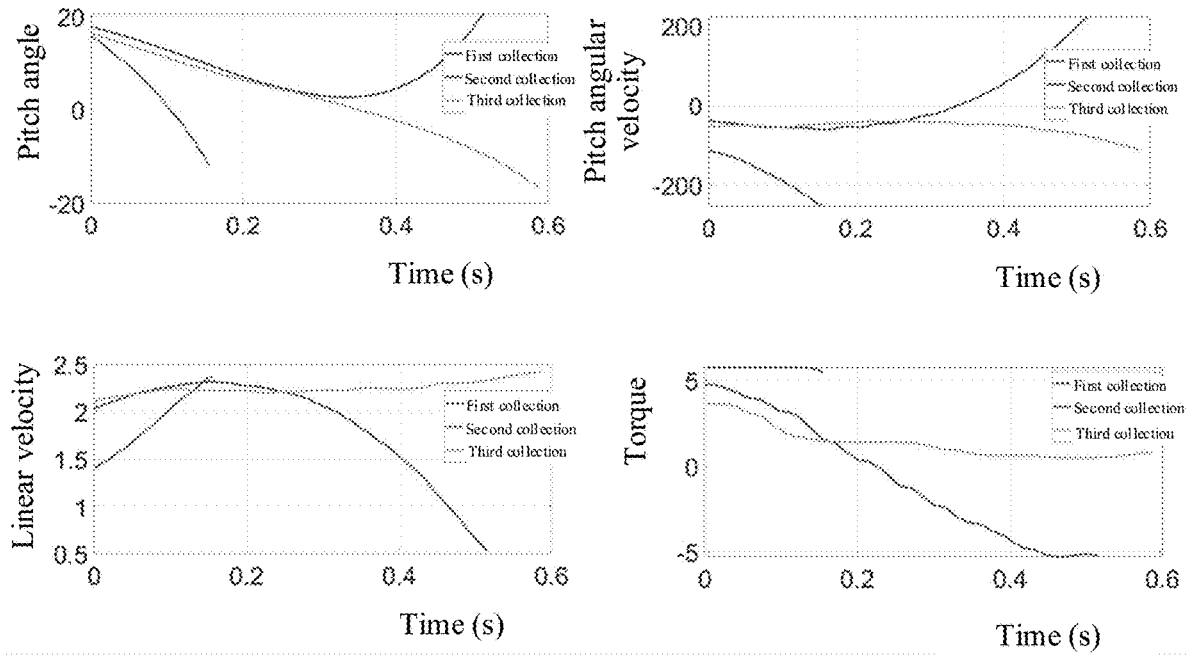
FIG. 11 illustrates a plot of collecting motion state data and control data of a robot according to an embodiment of the present disclosure.

A similar process is repeated for three times, and the data collected for the three times is plotted in FIG. 11, where the torque is the total torque of the two driving wheel motors. In particular, when the system is assumed to be linear, data close to a linear area of the simplified model is used, that is, −20 deg<tilt angle<20 deg. As illustrated in FIG. 11, the durations of the three data collections are 0.515 seconds, 0.155 seconds, and 0.586 seconds, respectively, for a total of 1.256 seconds. Any unskilled person may easily collect the short-time data by manually inputting torque via the remote controller. In addition, since the data iteration scheme may be performed offline, the parameters may be easily adjusted to make the iteration term converge.

Figure 12:
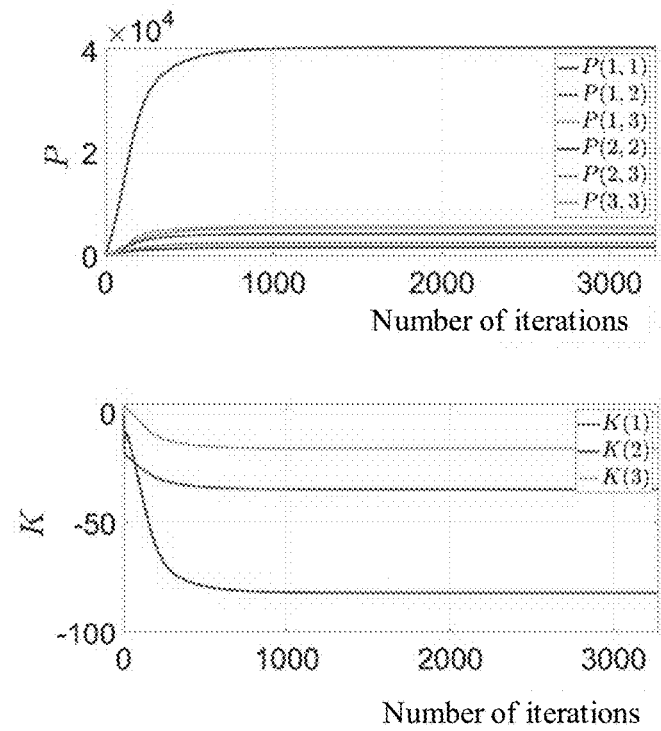
FIG. 12 illustrates a schematic iteration diagram of collecting a linear equilibrium parameter matrix in a process of a robot according to an embodiment of the present disclosure.

For the motion state data and the control data in FIG. 11 Q=diag[20000,8000,3000], R=20, $t_{i+1}-t_i$=0.1s are set, and the iteration schematic diagrams of P, K illustrated in FIG. 12 may be obtained. According to test by the experimenter, after the 3275th value iteration, converged K=[−81.99, −34.96, −16.38] may be obtained.

Figure 13:
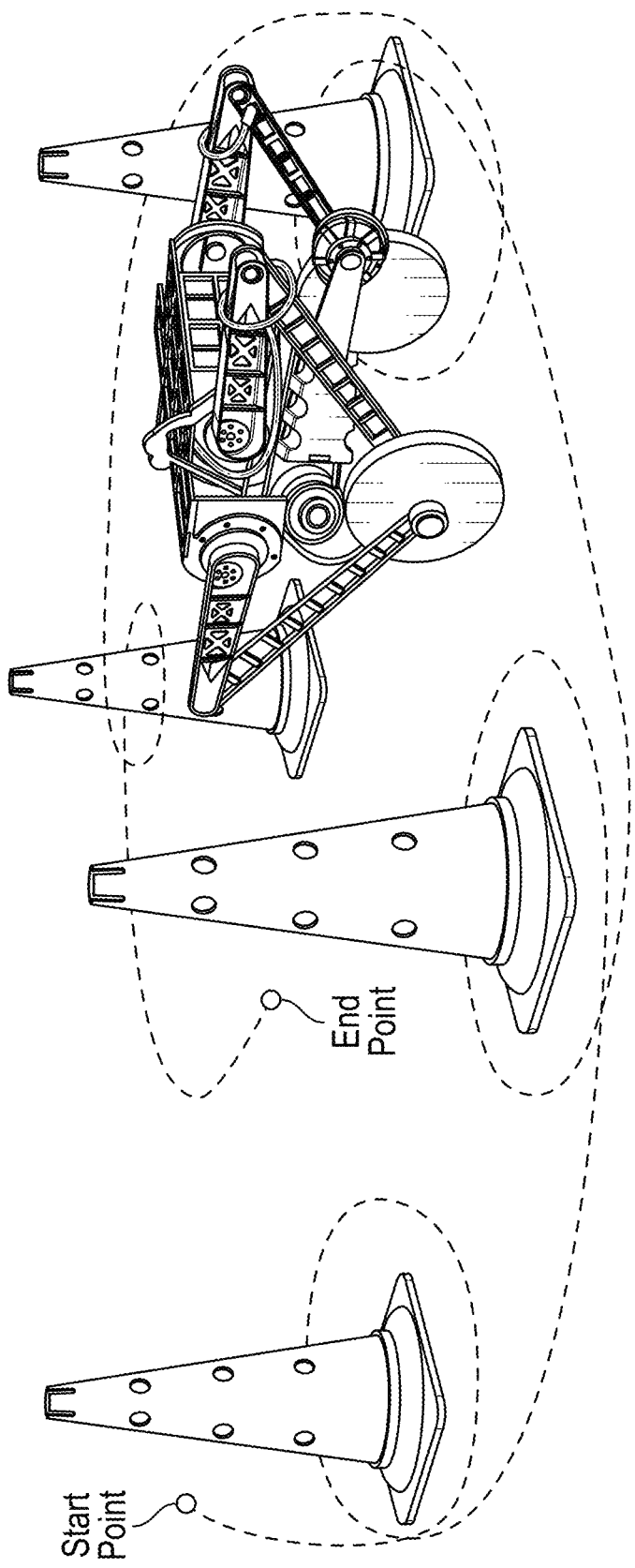
FIG. 13 illustrates a schematic experiment diagram of testing a controller of a robot according to an embodiment of the present disclosure.
Figure 14:
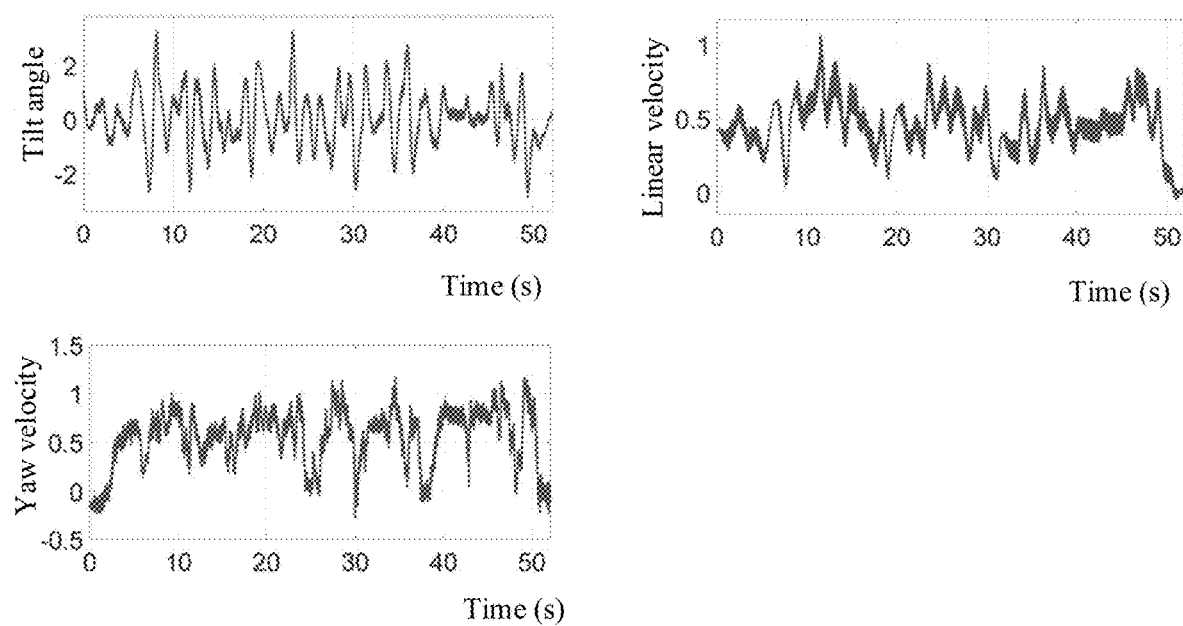
FIG. 14 illustrates an experiment data diagram of testing a controller of a robot according to an embodiment of the present disclosure.

Based on K=[−81.99, −34.96, −16.38], the controller corresponding to the dynamic characteristics of the robot is built. The controller is used to control a real robot to travel in the path illustrated in FIG. 13, and the test data of a tilt angle (which is approximately within plus or minus 2 deg), a linear velocity, and a yaw velocity illustrated in FIG. 14 are collected. It may be seen that a controller with strong enough robustness and stability may be obtained by using the data iteration scheme.

It is to be understood by a person skilled in the art that the controller may also be used to control other motions, and the present disclosure is not limited thereto. Furthermore, it has been tested that the robustness of the controller can be much higher than that of the PID controller, that is, when the robot 100 is externally disturbed, the robot under control of the controller may quickly recover its equilibrium.

Thus, the embodiment of the present disclosure addresses the problem of optimal equilibrium control of a robot without knowledge of the dynamic characteristics of the robot using a value iteration scheme based on reinforcement learning and ADP technologies in artificial intelligence. The process of building the controller of the embodiment of the present disclosure merely requires the wheel-legged robot to travel for a period of time/a section of trajectory under the control of a non-optimal controller/an arbitrary controller, and collect the motion state data and control data corresponding to the period of time/trajectory as training data. Thus, the amount of training data of the embodiment of the present disclosure is much smaller than the amount of data required by a related reinforcement learning algorithm. Further, according to the embodiment of the present disclosure, the trained controller gradually converges to a controller corresponding to the optimal solution to the linear quadratic regulation problem as the learning step increases, so that stability of a close-loop system can be ensured, the training process is greatly simplified, and additional limitations on training data are not required, so as to simplify the design process of a controller for a wheel-legged robot.

This disclosure provides a device for building a controller for a robot, the device including: a motion control module, a policy iteration module, and a second controller building module.

The motion control module is configured to control motion of the robot using a first controller, and obtaining motion state data and control data of the robot during the motion process.

The policy iteration module is configured to update a linear equilibrium parameter matrix of the first controller using a policy iteration manner according to the motion state data and the control data.

The second controller building module is configured to build a second controller corresponding to dynamic characteristics of the robot based on the updated linear equilibrium parameter matrix.

In some embodiments, the dynamic characteristics of the robot are associated with at least one variable parameter; the first controller corresponds to the dynamic characteristics of the variable parameter being at a first value; the second controller corresponds to the dynamic characteristics of the variable parameter being at a second value.

In some embodiments, the first controller controls the robot to move in an equilibrium-like motion state, and the robot in the equilibrium-like state is near an equilibrium point during the motion process; the robot under control of the second controller has a better control effect during the motion process compared to the robot under control of the first controller.

In some embodiments, both the first controller and the second controller are linear controllers; at each moment during the motion process, the control torque provided by the linear controllers is negatively correlated to a product of the linear equilibrium parameter matrix and the motion state data of the robot.

In some embodiments, the motion control module is further used for determining an initial control instruction by the first controller according to the current motion state of the robot; applying disturbance to the control data indicated by the initial control instruction to obtain the control data of the first controller; and controlling the robot to move according to the control data of the first controller, and collecting the motion state data in the motion process.

In some embodiments, the motion state data and the control data correspond to multiple time intervals. The policy iteration module is also used for performing a nonlinear combination of the motion state data and the control data corresponding to the multiple time intervals to determine a training data set; determining an iteration target term and determining an iteration relationship function based on the training data set; and performing multiple policy iterations on the iteration target term according to the iteration relationship function to approximate to obtain the linear equilibrium parameter matrix corresponding to the dynamic characteristics of the robot.

In some embodiments, the policy iteration module is further used for determining whether the iteration target term converges in each policy iteration, and stopping the policy iteration when the iteration target term converges; and updating the linear equilibrium parameter matrix according to the converged iteration target term.

In some embodiments, the iteration relationship function conforms to the form of a Lyapunov equation, and the iteration target term comprises a linear equilibrium parameter matrix to be iterated, and a solution to the Lyapunov equation with the linear equilibrium parameter matrix to be iterated as a parameter; the iteration relationship function is used for calculating the linear equilibrium parameter matrix corresponding to the next policy iteration according to the linear equilibrium parameter matrix in this policy iteration and the solution to the Lyapunov equation corresponding to this policy iteration.

In some embodiments, convergence of the iteration target term includes: the difference between the solutions to the Lyapunov equation corresponding to two adjacent policy iterations is less than a preset value.

In some embodiments, the device for building a controller for a robot also further includes a first controller building module configured to obtain historical motion state data and historical control data from historical motion data of the robot, the diversity measures of the historical motion state data and the historical control data being higher than a predetermined threshold; calculating the linear equilibrium parameter matrix using a value iteration manner according to the historical motion state data and the historical control data; and building a first controller for controlling the motion of the robot based on the linear equilibrium parameter matrix.

In some embodiments, the historical motion data is obtained based on driving each joint in wheel legs of the robot by control torque to drive the robot to move along the target trajectory.

The device for building a controller for a robot also further includes a control torque obtaining module configured to adaptively determine control information for controlling the driving wheels of the robot to rotate based on existing motion information of the robot; determining first control information for controlling multiple joints of the robot based on the control information for controlling the driving wheels to rotate, the first control information causing the robot to maintain equilibrium; determining second control information for controlling the multiple joints based on the target trajectory of the robot, the second control information causing the robot to move along the target trajectory; determining the control torque of each joint in the wheel legs of the robot based on the motion constraint conditions of the robot, the first control information, and the second control information.

This disclosure provides a device for controlling motion of a robot. The robot moves by driving wheels. The device includes: an instruction receiving module, an instruction execution module, a data obtaining module, a policy iteration module, and a driving force control module.

The instruction receiving module is configured to receive a motion instruction indicating a motion trajectory of the robot.

The instruction execution module is configured to control a driving force applied to the driving wheels by the first controller according to the motion instruction, to cause the robot to move according to the motion trajectory.

The data obtaining module is configured to obtain motion state data and control data of the robot during the motion process.

The policy iteration module is configured to build a second controller corresponding to dynamic characteristics of the robot using a policy iteration manner based on the motion state data and the control data.

The driving force control module is configured to control a driving force applied to the driving wheels using the second controller to cause smooth motion of the robot.

This disclosure further provides a computer-readable storage medium (such as a non-transitory computer-readable storage medium), storing computer-readable instructions, and the computer-readable instructions, when executed by one or more processors, perform the method of any above embodiment.

This disclosure further provides a computer program product comprising computer-readable instructions, and the computer-readable instructions, when executed by one or more processors, perform the method of any above embodiment.

The robot may also include, for example, a bus, a memory, a sensor component, a communication module, and an input-output device, according to actual needs. The embodiment of the present disclosure is not limited by the specific components of the robot.

The bus may be a circuit that interconnects the components of the robot and communicates communication information (for example, control messages or data) among the components.

The sensor component may be used for perceiving the physical world, including, for example, a camera, an infrared sensor, an ultrasonic sensor and the like. In addition, the sensor component may also include a device for measuring the current operation and motion state of the robot, such as a Hall sensor, a laser position sensor, or a strain gauge force sensor.

The communication module may, for example, be connected to a network through a wired or wireless connection to facilitate communication with the physical world (for example, a server). The communication module may be wireless and may include a wireless interface, such as an IEEE 802.11, Bluetooth, a wireless local area network ("WLAN") transceiver, or a radio interface for accessing a cellular telephone network (for example, a transceiver/antenna for accessing a CDMA, a GSM, a UMTS, or other mobile communication networks). In another example, the communication module may be wired and may include an interface such as Ethernet, USB, or IEEE 1394.

The input-output device may transmit, for example, a command or data inputted from the user or any other external device to one or more other components of the robot, or may output a command or data received from one or more other components of the robot to the user or other external device.

Multiple robots may constitute a robot system to cooperatively complete a task, the multiple robots being communicatively connected to a server and receiving a cooperative robot instruction from the server.

The program part of the above technology may be considered as "product" or "article of manufacture" present in the form of an executable code and/or related data, embodied or implemented by a computer-readable medium. A tangible and permanent storage medium may include any memory or storage for a computer, a processor, or a similar device or a related module, for example, a semiconductor memory, a tape drive, a disk drive, or any device capable of providing a storage function for software.

All or part of the software may sometimes communicate over a network, such as the Internet or other communication networks. Such communication may load software from one computer device or a processor to another. Therefore, another medium capable of transmitting software elements can also be used as a physical connection between local devices, for example, light waves, electric waves, and electromagnetic waves are transmitted through cables, optical cables, or the air. A physical medium over which a carrier wave travels, such as a cable, a wireless link, an optical cable, or a similar device, may also be thought of as the medium on which the software is carried. As used herein, in addition to a tangible "storage" medium being limited, other terms representing a computer- or machine-readable "medium" refer to media that participate during execution of any instructions by a processor.

The present disclosure uses certain words to describe the embodiment of the present disclosure. For example, "a first/second embodiment," "an embodiment," and/or "some embodiments" refer to a certain feature, structure, or characteristic relate to at least one embodiment of the present disclosure. Therefore, it is to be emphasized and noted that "an embodiment" or "one embodiment" or "an alternative embodiment" referred to two or more times in different places in the description are not necessarily referring to the same embodiment. Furthermore, certain features, structures, or characteristics in one or more embodiments of the present disclosure may be combined as appropriate.

Furthermore, a person skilled in the art may understand various aspects of the present disclosure may be explained and described with respect to a plurality of patentable classes or situations, including any new and useful combination of processes, machines, products, or materials, or any new and useful improvements thereof. Correspondingly, various aspects of the present disclosure may be entirely executed by hardware, may be entirely executed by software (including firmware, resident software, microcodes, and the like), or may be executed by a combination of hardware and software. The foregoing hardware or software may be referred to as "data block", "module", "engine", "unit", "component" or "system". In addition, various aspects of the present disclosure may be embodied as computer products located in one or more computer-readable media, the product including a computer-readable program code.

The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processor and/or memory. Each hardware module can be implemented using one or more processors (or processors and memory). Likewise, a processor (or processors and memory) can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Unless otherwise defined, all terms (including technical and scientific terms) used herein have the same meaning as commonly understood by one of ordinary skill in the art to which the present disclosure belongs. It is further to be understood that, the terms such as those defined in commonly used dictionaries are to be interpreted as having meanings that are consistent with their meanings in the context of the related art, and are not to be interpreted in an idealized or extremely formalized sense, unless so expressively defined herein.

Although several exemplary embodiments of the present disclosure are described, other embodiments are within the scope of the present disclosure. It is to be understood that, the above are merely exemplary embodiments of the present disclosure, and the present disclosure is not to be considered to be limited by the disclosed exemplary embodiments, and modifications to the disclosed embodiments and other embodiments fall within the scope of the disclosure.

What is claimed is:

1. A method for controlling a robot, the method comprising:
   controlling movement of the robot according to a first controller;
   obtaining motion state data and control data of the robot while the movement of the robot is controlled according to the first controller;
   updating a linear equilibrium parameter matrix of the first controller according to a policy iteration algorithm that uses the obtained motion state data and the control data; and
   generating a second controller of the robot based on the updated linear equilibrium parameter matrix, wherein
   the first controller is generated according to a dynamic characteristic of the robot being at a first value; and
   the dynamic characteristic is a height of the robot.

2. The method according to claim 1, wherein
   the second controller is generated according to the dynamic characteristic of the robot being at a second value.

3. The method according to claim 1, wherein
   the controlling the movement of the robot includes controlling the movement of the robot according to the first controller to move in a first equilibrium motion state; and
   the method further includes controlling the movement of the robot to move in a second equilibrium motion state, a stability of the robot in the second equilibrium motion state being greater than the stability of the robot in the first equilibrium motion state.

4. The method according to claim 1, wherein
   the controlling the movement of the robot according to the first controller includes determining a control torque that is negatively correlated to a product of the linear equilibrium parameter matrix and the motion state data of the robot.

5. The method according to claim 1, wherein the controlling the movement of the robot according to the first controller comprises:
   determining an initial control instruction by the first controller according to a current motion state of the robot, and
   applying a disturbance to the control data indicated by the initial control instruction to obtain the control data of the first controller; and
   controlling the movement of the robot according to the control data of the first controller.

6. The method according to claim 5, wherein
   the motion state data and the control data correspond to multiple time intervals, and
   the updating the linear equilibrium parameter matrix comprises:
   performing a nonlinear combination of the motion state data and the control data corresponding to the multiple time intervals to determine a training data set;
   determining an iteration target term and determining an iteration relationship function based on the training data set; and
   performing multiple policy iterations on the iteration target term according to the iteration relationship function to update the linear equilibrium parameter matrix.

7. The method according to claim 6, wherein the performing the multiple policy iterations on the iteration target term comprises:
  determining whether the iteration target term converges in each policy iteration of the multiple policy iterations;
  stopping the performing of the multiple policy iterations when the iteration target term converges; and
  updating the linear equilibrium parameter matrix according to the converged iteration target term.

8. The method according to claim 7, wherein
  the iteration relationship function is based on a Lyapunov equation,
  the iteration target term includes the linear equilibrium parameter matrix to be iterated, and a solution to the Lyapunov equation with the linear equilibrium parameter matrix to be iterated as a parameter, and
  the iteration relationship function calculates the linear equilibrium parameter matrix corresponding to a next policy iteration according to the linear equilibrium parameter matrix in a current policy iteration and the solution to the Lyapunov equation corresponding to the current policy iteration.

9. The method according to claim 7, wherein the convergence of the iteration target term is determined based on a difference between solutions to a Lyapunov equation corresponding to two adjacent policy iterations being less than a preset value.

10. The method according to claim 1, further comprising:
  obtaining historical motion state data and historical control data from historical motion data of the robot;
  calculating the linear equilibrium parameter matrix according to a value iteration algorithm based on the historical motion state data and the historical control data; and
  generating the first controller based on the linear equilibrium parameter matrix.

11. The method according to claim 10, wherein
  the historical motion data is obtained based on driving each joint in wheel legs of the robot by a respective control torque to drive the robot to move along a target trajectory; and
  the method further comprises:
    adaptively determining first control information for controlling driving wheels of the robot to rotate based on existing motion information of the robot;
    determining second control information for controlling multiple joints of the robot based on the first control information for controlling the driving wheels to rotate, the multiple joints being controlled based on the second control information to balance the robot;
    determining third control information for controlling the multiple joints based on the target trajectory of the robot, the multiple joints being controlled based on the third control information to move the robot along the target trajectory; and
    determining the respective control torque of each joint in the wheel legs of the robot based on the second control information and the third control information.

12. A method for controlling a robot, the method comprising:
  receiving motion trajectory information that indicates a motion trajectory of the robot;
  controlling a driving force, which is applied to driving wheels of the robot by a first controller based on the motion trajectory information, to move the robot according to the motion trajectory;
  obtaining motion state data and control data of the robot during the movement according to the motion trajectory;
  generating a second controller of the robot according to a policy iteration algorithm that uses the motion state data and the control data; and
  controlling the driving force applied to the driving wheels according to the second controller, wherein
  the first controller is generated according to a dynamic characteristic of the robot being at a first value; and
  the dynamic characteristic is a height of the robot.

13. A robot control apparatus, comprising:
  processing circuitry configured to:
    control movement of a robot according to a first controller;
    obtain motion state data and control data of the robot while the movement of the robot is controlled according to the first controller;
    update a linear equilibrium parameter matrix of the first controller according to a policy iteration algorithm that uses the obtained motion state data and the control data; and
    generate a second controller of the robot based on the updated linear equilibrium parameter matrix, wherein
  the first controller is generated according to a dynamic characteristic of the robot being at a first value; and
  the dynamic characteristic is a height of the robot.

14. The robot control apparatus according to claim 13, wherein
  the second controller that is generated according to the dynamic characteristic of the robot being at a second value.

15. The robot control apparatus according to claim 13, wherein
  the first controller is configured to control the robot to move in a first equilibrium motion state; and
  the second controller is configured to control the robot to move in a second equilibrium motion state, a stability of the robot in the second equilibrium motion state being greater than the stability of the robot in the first equilibrium motion state.

16. A robot, comprising
  the robot control apparatus according to claim 13; and
  wheel legs; and
  a driving motor configured to drive driving wheels of the wheel legs to move the robot according to the first controller or the second controller.

* * * * *